US012487813B2

United States Patent
Nakamura et al.

(10) Patent No.: US 12,487,813 B2
(45) Date of Patent: Dec. 2, 2025

(54) VEHICULAR ELECTRONIC CONTROL DEVICE AND UPDATE PROGRAM

(71) Applicant: DENSO CORPORATION, Kariya (JP)

(72) Inventors: Sho Nakamura, Kariya (JP); Kazuhiro Uehara, Kariya (JP); Hideo Yoshimi, Kariya (JP); Tomoya Ogawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 218 days.

(21) Appl. No.: 18/510,626

(22) Filed: Nov. 15, 2023

(65) Prior Publication Data

US 2024/0086174 A1 Mar. 14, 2024

Related U.S. Application Data

(63) Continuation of application No. PCT/JP2022/019108, filed on Apr. 27, 2022.

(30) Foreign Application Priority Data

May 24, 2021 (JP) ................................. 2021-086936

(51) Int. Cl.
*G06F 8/65* (2018.01)
(52) U.S. Cl.
CPC ...................... *G06F 8/65* (2013.01)
(58) Field of Classification Search
CPC ........................................................ G06F 8/65
See application file for complete search history.

(56) References Cited

U.S. PATENT DOCUMENTS

| | | | |
|---|---|---|---|
| 2013/0132939 A1 | 5/2013 | Murata et al. | |
| 2017/0262277 A1* | 9/2017 | Endo | G06F 8/658 |
| 2020/0050378 A1 | 2/2020 | Sakurai et al. | |
| 2020/0050442 A1 | 2/2020 | Sakurai et al. | |
| 2020/0174778 A1* | 6/2020 | David | H04W 4/80 |
| 2020/0183676 A1 | 6/2020 | Sakurai et al. | |

(Continued)

FOREIGN PATENT DOCUMENTS

| | | | | |
|---|---|---|---|---|
| CN | 111342151 A | * | 6/2020 | ............ B60L 58/12 |
| CN | 111762066 A | * | 10/2020 | ......... H01M 10/615 |

(Continued)

OTHER PUBLICATIONS

OTA Software Update—Vehicle Functional Requirements Definition—Jaspar Standard Document: ST-OTA-4 Ver.1.1 Issued on Aug. 7, 2020, pp. 1-61.

*Primary Examiner* — Jae U Jeon
(74) *Attorney, Agent, or Firm* — Harness, Dickey & Pierce, P.L.C.

(57) ABSTRACT

A vehicular electronic control device installed in a vehicle capable of switching between a chargeable state and an unchargeable state performs activation acceptance for inquiring of a user whether to accept activation processing of activating updated software after completion of installation processing of writing update data in an update target node to generate the updated software, transmits during the chargeable state a switching instruction that executes the activation processing during the chargeable state to the update target node, and transmits during the chargeable state a switching setting instruction that executes the activation processing during the unchargeable state to the update target node.

17 Claims, 17 Drawing Sheets

(56) References Cited

U.S. PATENT DOCUMENTS

| | | | |
|---|---|---|---|
| 2020/0241771 A1 | 7/2020 | Sakurai et al. | |
| 2021/0026617 A1* | 1/2021 | Maru | ........................ G06F 8/65 |
| 2021/0155176 A1 | 5/2021 | Harata et al. | |
| 2021/0157529 A1 | 5/2021 | Sakurai et al. | |
| 2021/0157566 A1 | 5/2021 | Sakurai et al. | |
| 2021/0157567 A1 | 5/2021 | Sakurai et al. | |
| 2021/0157568 A1 | 5/2021 | Sakurai et al. | |
| 2021/0157571 A1 | 5/2021 | Ogawa et al. | |
| 2021/0157572 A1 | 5/2021 | Harata et al. | |
| 2021/0157575 A1 | 5/2021 | Ogawa et al. | |
| 2021/0157902 A1 | 5/2021 | Sakurai et al. | |
| 2022/0012043 A1 | 1/2022 | Sakurai et al. | |

FOREIGN PATENT DOCUMENTS

| | | | |
|---|---|---|---|
| JP | H1097426 A | 4/1998 | |
| JP | 2020027627 A | 2/2020 | |
| WO | WO-2011161778 A1 | 12/2011 | |
| WO | WO-2020032196 A1 | 2/2020 | |

\* cited by examiner

VEHICULAR ELECTRONIC CONTROL DEVICE AND UPDATE PROGRAM

CROSS REFERENCE TO RELATED APPLICATIONS

The present application is a continuation application of International Patent Application No. PCT/JP2022/019108 filed on Apr. 27, 2022 which designated the U.S. and The present application claims the benefit of priority from Japanese Patent Application No. 2021-086936 filed on May 24, 2021. The entire disclosures of all of the above applications are incorporated herein by reference.

TECHNICAL FIELD

The present disclosure relates to a vehicular electronic control device and an update program.

BACKGROUND

A technology has been proposed in which a vehicular electronic control device functioning as a gateway ECU is provided on a vehicle side, and in the vehicular electronic control device, update data downloaded from a center device is delivered to an update target node, and software of the update target node is updated by over the air (OTA).

SUMMARY

According to an example, a vehicular electronic control device installed in a vehicle capable of switching between a chargeable state and an unchargeable state may be configured to: perform activation acceptance for inquiring of a user whether to accept activation processing of activating updated software after completion of installation processing of writing update data in an update target node to generate the updated software; transmit during the chargeable state a switching instruction that executes the activation processing during the chargeable state to the update target node; and transmit during the chargeable state a switching setting instruction that executes the activation processing during the unchargeable state to the update target node.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
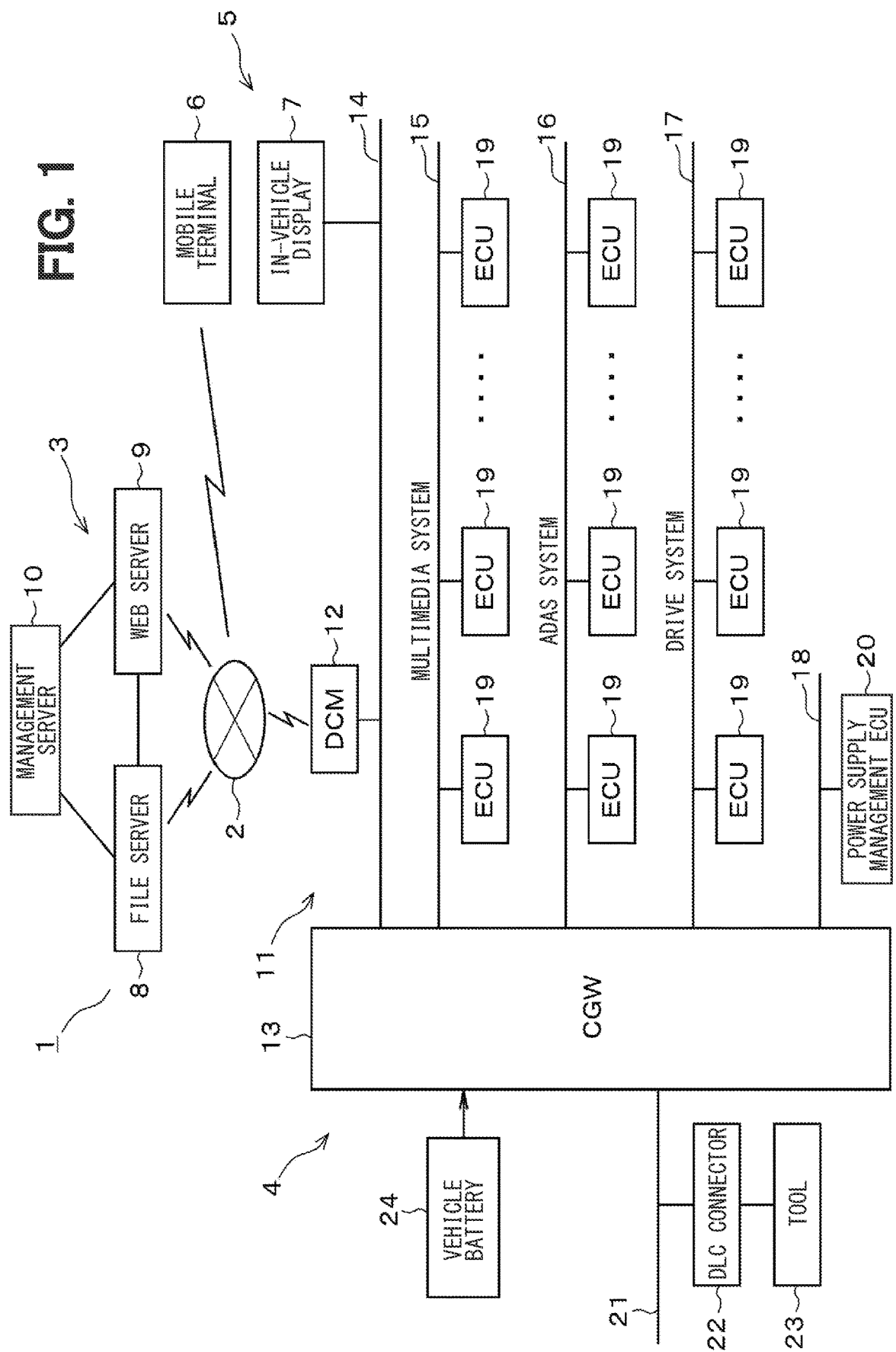
FIG. 1 is a diagram illustrating an overall configuration of an embodiment.

In recent years, with diversification of vehicle control such as a driving-assistance function and an automated driving function, a scale of software including programs and data for vehicle control, diagnosis, and the like installed in a node such as an electronic control device (hereinafter, referred to as an electronic control unit (ECU)) of a vehicle is increasing. Furthermore, with version up by function improvement or the like, there is an increasing opportunity to update (relog) the software necessary for the operation of the node. On the other hand, with the development of communication networks, a connected car technology has also become widespread. Under such circumstances, a technology has been proposed in which a vehicular electronic control device functioning as a gateway ECU is provided on a vehicle side, and in the vehicular electronic control device, update data downloaded from a center device is delivered to an update target node, and software of the update target node is updated by over the air (OTA).

When an installation completion notification indicating completion of installation processing is received from an update target node after an installation instruction to write update data is transmitted to the update target node, the vehicular electronic control device performs activation acceptance that inquires of a user whether to accept the activation processing after the ignition (hereinafter, referred to as IG) is switched from IG-on to IG-off. Thereafter, when the acceptance permission of the activation is specified by the user, the vehicular electronic control device transmits a switching instruction to instruct execution of the activation processing to the update target node. when receiving the switching instruction from the vehicular electronic control device, the update target node performs activation processing of activating the updated software. When receiving the activation completion notification indicating the completion of the activation processing from the update target node, the vehicular electronic control device performs system consistency check processing. When a result of the consistency check is negative, the vehicular electronic control device performs retry processing of retransmitting the switching instruction to the update target node, or performs rollback processing of returning the software of the update target node to a state before the installation processing.

However, as described above, in the configuration in which the activation acceptance is performed after the switching from IG-on to IG-off, that is, in the IG-off state, there is a possibility that the power consumption of a vehicle battery increases.

The present disclosure provides a vehicular electronic control device and update program to ensure safe and secure software update while suppressing the power consumption of the vehicle battery.

According to one aspect of the present disclosure, a vehicular electronic control device that is installed in a vehicle capable of switching between a chargeable state in which a vehicle battery is capable of being charged and an unchargeable state in which the vehicle battery is incapable of being charged, and operates with power supplied from the vehicle battery as operating power is provided. The vehicular electronic control device may include: an activation acceptance execution unit that is configured to perform activation acceptance for inquiring of a user whether to accept activation processing of activating updated software after completion of installation processing of writing update data in an update target node to generate the updated software; a switching instruction transmission unit that is configured to transmit during the chargeable state a switching instruction that executes the activation processing during the chargeable state to the update target node executing the activation processing during the chargeable state in a case where acceptance permission of activation is specified; and a switching setting instruction transmission unit that is configured to transmit during the chargeable state a switching setting instruction that executes the activation processing during the unchargeable state to the update target node executing the activation processing during the unchargeable state in a case where the acceptance permission of activation is specified. The activation acceptance execution unit performs the activation acceptance during the chargeable state.

By accepting the activation while the vehicle state is in a chargeable state in which the vehicle battery can be charged, it is possible to ensure the safe and secure software update while suppressing the power consumption of the vehicle battery, unlike the related art in which the activation is accepted in the IG-off state.

Hereinafter, an embodiment will be described with reference to the drawings. In the present embodiment, a description will be made on the premise of a configuration that a vehicle electronic control system installed in an automobile on which an engine as an internal combustion engine is mounted is a description target, IG-on, which is a driving state of the engine, is a chargeable state in which a vehicle battery can be charged, and IG-off, which is a stopped state of the engine, is an unchargeable state in which the vehicle battery cannot be charged. As long as the vehicle can switch between the chargeable state in which the vehicle battery can be charged and the unchargeable state in which the vehicle battery cannot be charged, the vehicle electronic control system installed in an electric vehicle that travels with a motor instead of mounting the engine may be targeted.

The vehicle electronic control system is a system in which software for vehicle control, diagnosis, and the like installed in an electronic control device (hereinafter, referred to as an electronic control unit (ECU)) can be updated by over the air (OTA). The software includes programs and data for implementing functions such as vehicle control and diagnosis, and can also be expressed as an application. In the present embodiment, a case where software for vehicle control or diagnosis is updated will be described, but for example, the present invention can also be applied to a case where a map application, or map data used in the map application is updated.

As illustrated in FIG. 1, a vehicle electronic control system 1 includes a center device 3 on a communication network 2 side, a vehicle-side system 4 on the vehicle side, and a display terminal 5. The communication network 2 includes, for example, a mobile communication network with a 4G line, the Internet, and Wireless Fidelity (WiFi) (registered trademark).

The display terminal 5 as a human machine interface (HMI) is a terminal having a function of receiving an operation input from the user and a function of displaying various screens, and is, for example, a mobile terminal 6 such as a smartphone or a tablet that can be carried by the user, and an in-vehicle display 7 disposed inside the vehicle. The mobile terminal 6 can perform data communication with the center device 3 via the communication network 2 as long as the mobile terminal 6 is within a communication range of the mobile communication network. The in-vehicle display 7 may be connected to the vehicle-side system 4 and also have a navigation function. The in-vehicle display 7 may be an in-vehicle display ECU having an ECU function, or may have a function of controlling display on a center display, a meter display, or the like.

When the user is outside the vehicle and within the communication range of the mobile communication network, the user can perform an operation input while checking various screens involved in the update of the software with the mobile terminal 6 and perform a procedure involved in the update of the software. Inside the vehicle, the user performs an operation input while checking various screens involved in the update of the software with the in-vehicle display 7, and can perform a procedure involved in the update of the software. That is, the user can selectively use the mobile terminal 6 and the in-vehicle display 7 outside and inside the vehicle to perform a procedure involved in updating the software.

The center device 3 controls an update function of software on the communication network 2 side in the vehicle electronic control system 1, and functions as an OTA center that provides an OTA service. The center device 3 includes a file server 8, a web server 9, and a management server 10, and the servers 8 to 10 are configured to be capable of performing data communication with each other. That is, the center device 3 includes a plurality of servers having different functions. The center device 3 may be configured by a single server.

The file server 8 is a server that manages files of software delivered from the center device 3 to the vehicle-side system 4. The file server 8 manages update data provided from a supplier or the like which is a provider of software delivered from the center device 3 to the vehicle-side system 4, specification data provided from an original equipment manufacturer (OEM), a vehicle state acquired from the vehicle-side system 4, and the like.

The file server 8 can perform data communication with the vehicle-side system 4 via the communication network 2, transmits campaign information to the vehicle-side system 4, and transmits specification data to the vehicle-side system 4. When receiving a download request of package data from the vehicle-side system 4, the file server 8 transmits the package data in which the update data is packaged to the vehicle-side system 4. The package data includes a compressed zip file. The file server 8 may simultaneously transmit the specification data and the update data to the vehicle-side system 4 by transmitting the package data in which the specification data and the update data are packaged to the vehicle-side system 4.

The web server 9 is a server that manages web information. The web server 9 transmits web data managed by the web server 9 in response to a request from a web browser of the mobile terminal 6 or the like. The management server 10 is a server that manages personal information of a user registered in a software update service, an update history of software for each vehicle, and the like.

The vehicle-side system 4 includes a vehicle master device 11. The vehicle master device 11 controls an update function of software on the vehicle side in the vehicle electronic control system 1 and functions as an OTA master. The vehicle master device 11 includes a data communication module (DCM) 12 and a central gate way (CGW) 13.

The DCM 12 performs data communication with the center device 3 via the communication network 2, and corresponds to a download processing execution unit. The CGW 13 functions as a gateway ECU and corresponds to the vehicular electronic control device. The DCM 12 and the CGW 13 are connected so as to perform data communication via a first bus 14. Although FIG. 1 illustrates a configuration in which the DCM 12 and the in-vehicle display 7 are connected to the same first bus 14, the DCM 12 and the in-vehicle display 7 may be connected to separate buses. The CGW 13 may have some or all of the functions of the DCM 12, or the DCM 12 may have some or all of the functions of the CGW 13. That is, in the vehicle master device 11, the function of the DCM 12 and the function of the CGW 13 may be shared in any manner. The vehicle master device 11 may include two ECUs of the DCM 12 and the CGW 13, or may include one integrated ECU having the function of the DCM 12 and the function of the CGW 13.

In addition to the first bus 14, a second bus 15, a third bus 16, a fourth bus 17, and a fifth bus 18 are connected to the CGW 13 as buses on the inside of the vehicle. Various ECUs 19 are connected to the CGW 13 via the buses 15 to 17, and a power supply management ECU 20 is connected to the CGW 13 via a bus 18. Each of the ECUs 19 corresponds to a node.

The second bus 15 is, for example, a multimedia system bus, and is connected to the ECU 19 that controls the multimedia system. The third bus 16 is, for example, an advanced driver-assistance systems (ADAS) bus for driving assistance and automated driving and is connected to the ECU 19 that controls the ADAS system. The fourth bus 17 is, for example, a bus of a drive system for vehicle traveling, and is connected to the ECU 19 that controls the drive system. The buses 15 to 17 may be a bus of a system other than the multimedia system bus, the ADAS system bus, or the drive system bus. The number of buses and the number of ECUs 19 are not limited to the illustrated configuration. The power supply management ECU 20 is an ECU that manages power supply supplied to the DCM 12, the CGW 13, the various ECUs 19, and the like.

A sixth bus 21 is connected to the CGW 13 as a bus outside the vehicle. A data link coupler (DLC) connector 22 to which a tool 23 functioning as a service tool is detachably connected is connected to the sixth bus 21. The buses 14 to 18 on the inside of the vehicle and the bus 21 on the outside of the vehicle are configured by, for example, a controller area network (CAN) (registered trademark) bus, and the CGW 13 performs data communication among the DCM 12, various ECUs 19, and the tool 23 in accordance with a CAN data communication standard or a diagnostic communication standard (unified diagnosis services (UDS): ISO 14229). The DCM 12 and the CGW 13 may be connected by Ethernet, or the DLC connector 22 and the CGW 13 may be connected by Ethernet.

The CGW 13 operates using power supplied from a vehicle battery 24 as operating power. The vehicle battery 24 can be charged by being supplied with the power generated by an alternator of the engine in an IG-on state. That is, in the IG-on state, the vehicle state is a chargeable state in which the vehicle battery 24 can be charged, and in an IG-off state, the vehicle state is an unchargeable state in which the vehicle battery 24 cannot be charged.

The CGW 13 transmits a download request of the package data to the center device 3 via the DCM 12 in a case where a condition under which the package data can be downloaded is satisfied. The condition under which the package data can be downloaded includes that the acceptance of the download is obtained, that the CGW 13 can perform data communication with the center device 3 via the DCM 12, that the free capacity of the storage of the DCM 12 is equal to or more than a predetermined capacity, and that the remaining capacity of an in-vehicle battery is equal to or more than a predetermined capacity. When the package data is downloaded from the center device 3 via the DCM 12, the CGW 13 acquires update data from the downloaded package data.

In a case where a condition under which installation of writing update data can be instructed is satisfied, the CGW 13 instructs the update target ECU 19 of the software to install the acquired update data. The condition under which the installation can be instructed includes that the acceptance of the installation is obtained, that the vehicle state is an installable state, that the update target ECU 19 is in an installable state, that the update data is normal data, and that the remaining capacity of the in-vehicle battery is equal to or more than a predetermined capacity. When installation of the update data is instructed from the CGW 13, the update target ECU 19 executes the installation of the update data.

When the installation of the update data is completed in the update target ECU 19, the CGW 13 instructs the update target ECU 19 to perform activation in a case where a condition under which activation to activate the software after the installation completion can be instructed is satisfied. The condition under which the activation can be instructed includes that the acceptance of the activation is obtained, that the vehicle state is an activatable state, that the update target ECU 19 is in an activatable state, and that the remaining capacity of the in-vehicle battery is equal to or more than a predetermined capacity. When the activation is instructed from the CGW 13, the update target ECU 19 executes an activation.

Figure 2:
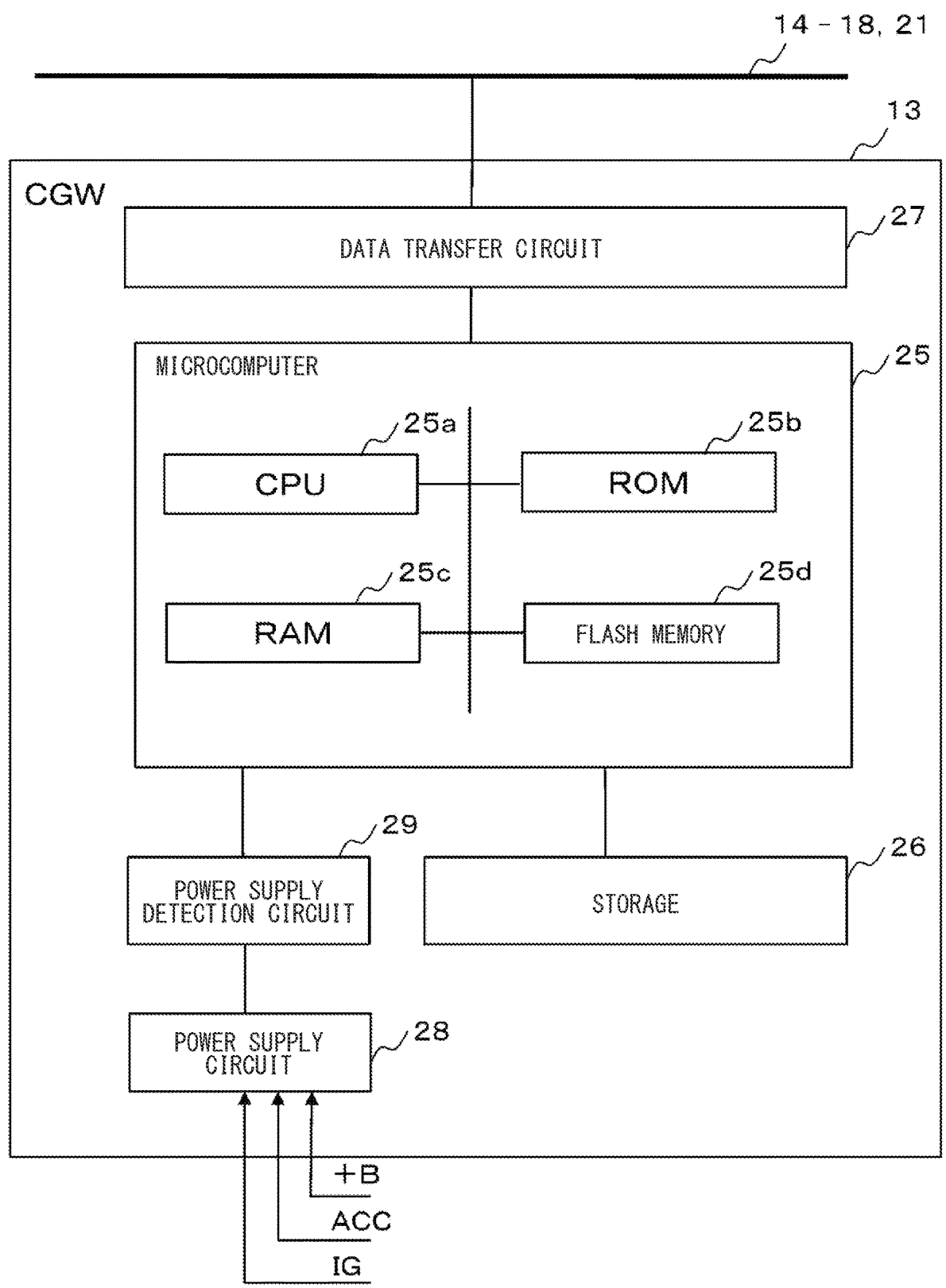
FIG. 2 is a diagram illustrating an electrical configuration of a CGW.

As illustrated in FIG. 2, the CGW 13 includes, as electrical functional blocks, a microcomputer 25, a storage 26, a data transfer circuit 27, a power supply circuit 28, and a power supply detection circuit 29. The microcomputer 25 includes a central processing unit (CPU) 25a, a read only memory (ROM) 25b, a random access memory (RAM) 25c, and a flash memory 25d. The flash memory 25d includes a secure area in which information cannot be read from the outside of the CGW 13. The microcomputer 25 executes various control programs stored in a non-transitory tangible storage medium to perform various processing, and controls the operation of the CGW 13. In the present embodiment, the configuration in which one microcomputer 25 is installed in the CGW 13 is exemplified, but the number, specification, and combination of the microcomputers installed in the CGW 13 are determined in accordance with the processing capacity required for the CGW 13. That is, in a case where the CGW 13 is required to have relatively high processing capacity, a microcomputer with a relatively high specification is adopted, or a plurality of the microcomputers are adopted to implement distributed processing or parallel processing.

The storage 26 is, for example, an embedded Multi Media Card (eMMC) or a NorFlash. The data transfer circuit 27 controls data communication conforming to the CAN data communication standard or diagnostic communication standard among the buses 14 to 18 and 21. The power supply circuit 28 receives battery power supply, accessory (hereinafter, referred to as ACC) power supply, and IG power supply. The power supply detection circuit 29 detects a voltage value of the battery power supply, a voltage value of the ACC power supply, and a voltage value of the IG power supply, which are input by the power supply circuit 28, compares these detected voltage values with a predetermined voltage threshold, and outputs a comparison result to the microcomputers 25 and 26. The microcomputers 25 and 26 determine whether the battery power supply, the ACC power supply, and the IG power supply, which are supplied from the vehicle battery 24 to the CGW 13, are normal or abnormal based on the comparison result input from a power supply detection circuit 29.

Figure 3:
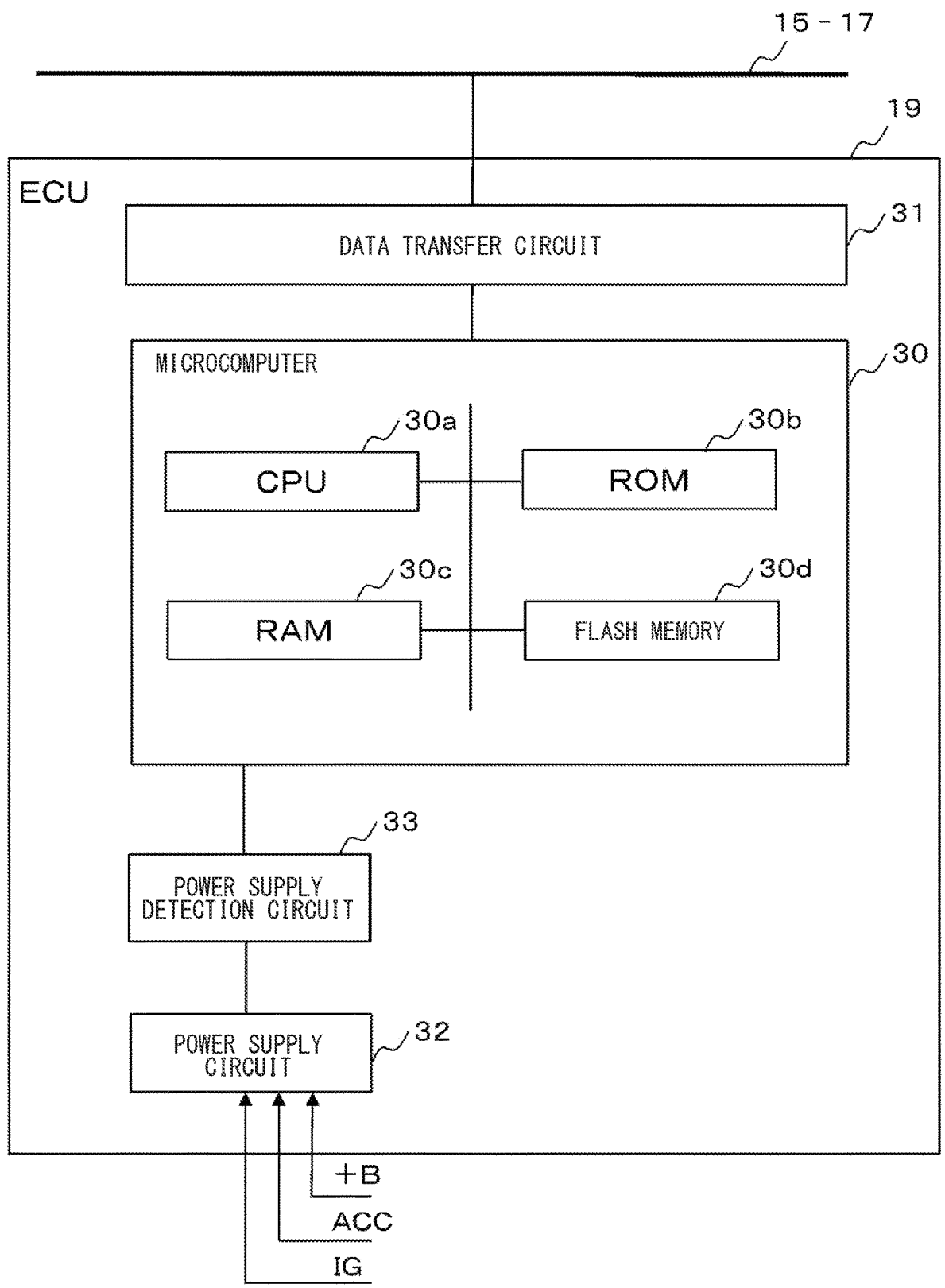
FIG. 3 is a diagram illustrating an electrical configuration of an ECU.

As illustrated in FIG. 3, the ECU 19 includes, as electrical functional blocks, a microcomputer 30, a data transfer circuit 31, a power supply circuit 32, and a power supply detection circuit 33. The microcomputer 30 includes a CPU 30a, a ROM 30b, a RAM 30c, and a flash memory 30d. The flash memory 30d includes a secure area in which information cannot be read from the outside of the ECU 19. The microcomputer 30 executes various control programs stored in a non-transitory tangible storage medium to perform various processing, and controls the operation of the ECU 19.

The data transfer circuit 31 controls data communication conforming to the CAN data communication standard between the buses 15 to 17. The power supply circuit 32 receives the battery power supply, the ACC power supply, and the IG power supply. The power supply detection circuit 33 detects a voltage value of the battery power supply, a voltage value of the ACC power supply, and a voltage value of the IG power supply, which are input by the power supply circuit 32, compares these detected voltage values with a predetermined voltage threshold, and outputs a comparison result to the microcomputer 30. The microcomputer 30 determines whether the battery power supply, the ACC power supply, and the IG power supply, which are supplied from the vehicle battery 24 to the ECU 19, are normal or abnormal based on the comparison result input from power supply detection circuit 27. The ECU 19 has different loads on, for example, a sensor, an actuator, and the like which are connection targets connected to the ECU 19, and basically has the same configuration.

Next, a memory configuration of the ECU 19 will be described. Types of flash memory 30d installed in the ECU 19 include a single-sided memory, a pseudo double-sided memory, a double-sided memory, and an external memory. The single-sided memory has a flash surface on one side, has no concept of an operation side and a non-operation side, and cannot update the software while the software is being executed. The ECU 19 equipped with the single-sided memory (hereinafter, referred to as a single-sided memory ECU) performs installation processing and activation processing in the IG-off state. The pseudo double-sided memory is configured to have flash surfaces on two sides in a pseudo manner, has concepts of an operation side and a non-operation side, and can update the non-operational software while executing the operational software, but there is a restriction on a timing at which reading and writing can be normally performed. The ECU 19 equipped with the pseudo double-sided memory (hereinafter, referred to as a pseudo double-sided memory ECU) performs installation processing and activation processing in the IG-off state.

The double-sided memory is configured to have flash surfaces on two sides substantially, has concepts of an operation side and a non-operation side, can update the non-operational software while executing the operational software, and there is no restriction on a timing at which reading and writing can be normally performed. The ECU 19 equipped with the double-sided memory (hereinafter, referred to as a double-sided memory ECU) can perform installation processing in the IG-on state, and activation processing in the IG-off state. The external memory is configured to have a flash surface on one side, and has no concept of an operation side and a non-operation side. However, the external memory is used as a temporary saving area of the software by copying the software stored on the flash surface to the external memory. The ECU 19 equipped with the external memory (hereinafter, referred to as an external memory ECU) performs installation processing and activation processing in the IG-off state.

Figure 4:
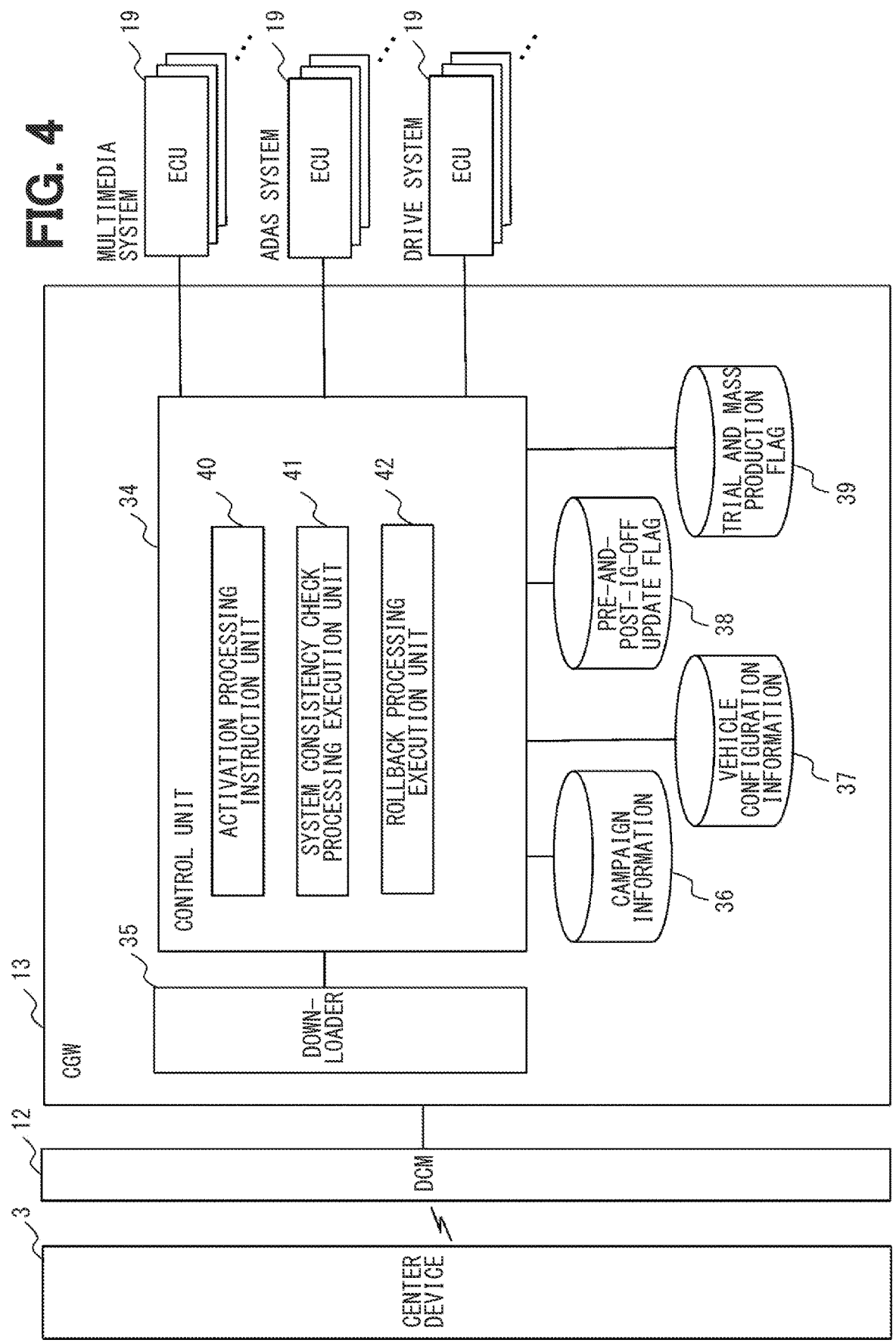
FIG. 4 is a functional block diagram of a CGW.

As illustrated in FIG. 4, the CGW 13 includes, as a configuration for each function, a control unit 34, a downloader 35, a campaign information storage unit 36, a vehicle configuration information storage unit 37, a pre-and-post-IG-off update flag storage unit 38, and a trial and mass production flag storage unit 39. The control unit 34 includes an activation processing instruction unit 40, a system consistency check processing execution unit 41, and a rollback processing execution unit 42.

Figure 5:
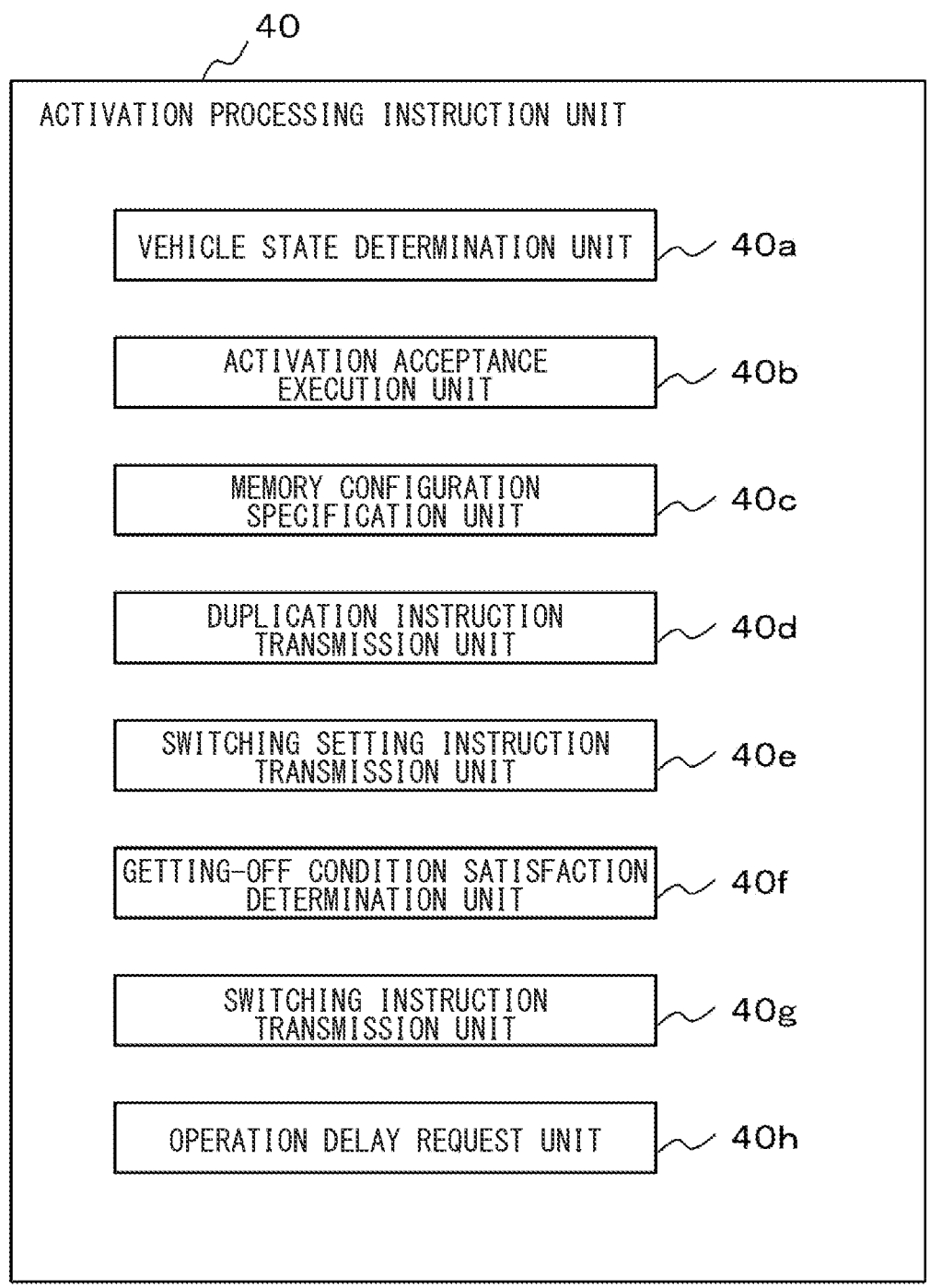
FIG. 5 is a functional block diagram of an activation processing instruction unit.
Figure 6:
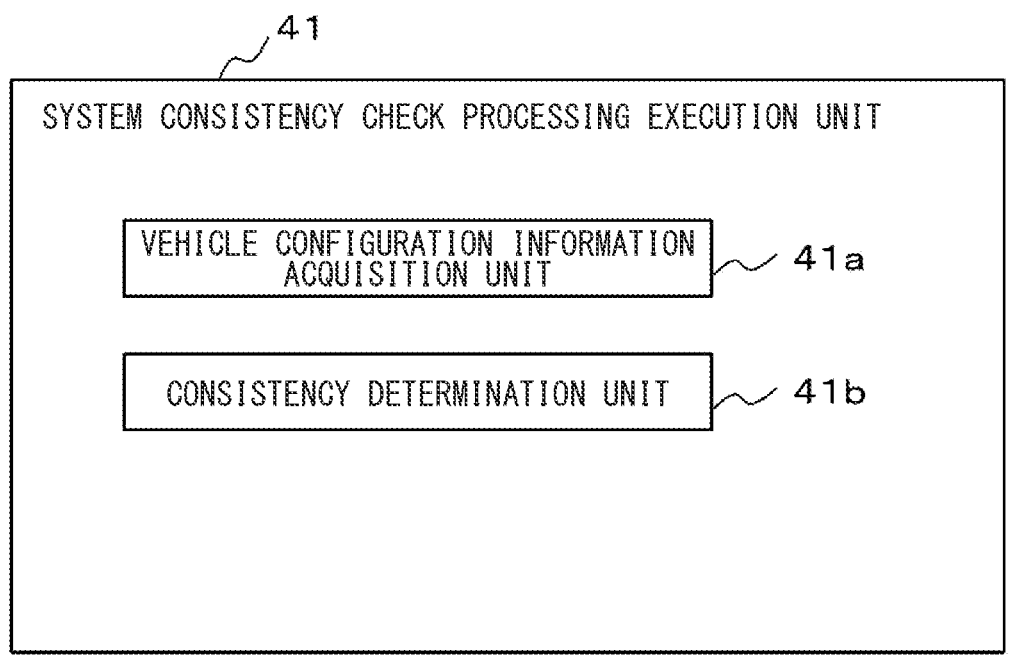
FIG. 6 is a functional block diagram of a system consistency check processing execution unit.
Figure 7:
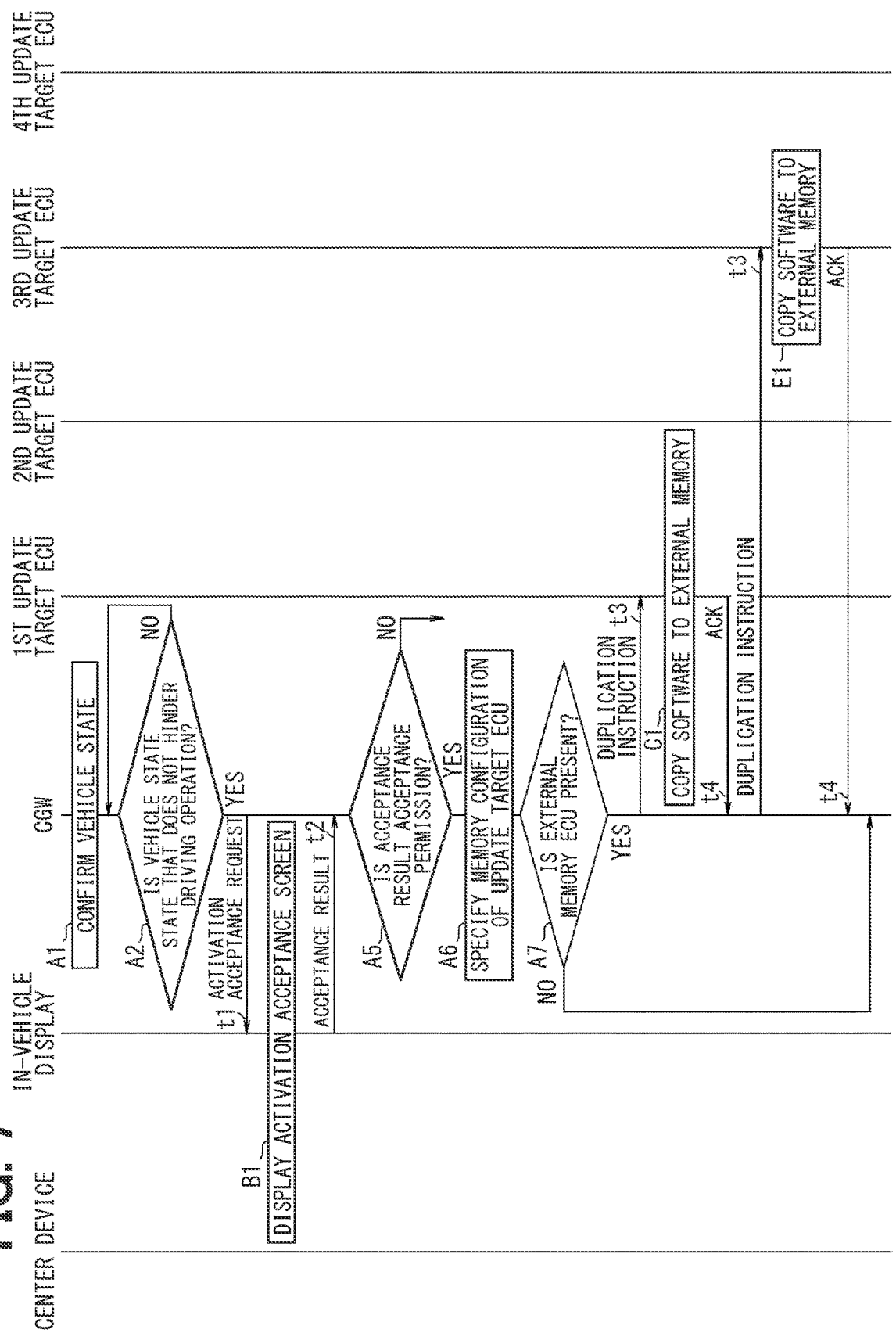
FIG. 7 is a diagram illustrating a flow of processing (part 1)
Figure 8:
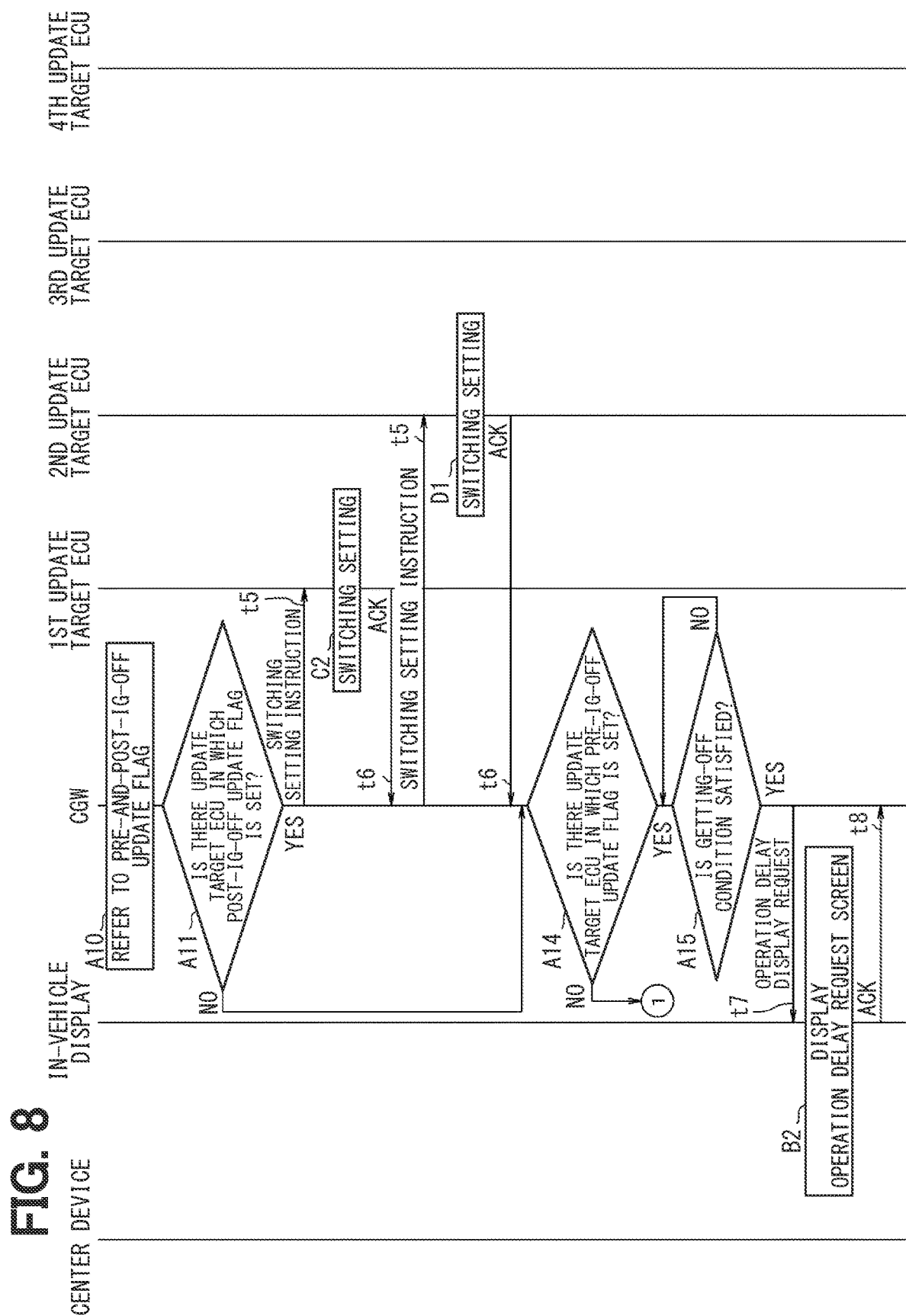
FIG. 8 is a diagram illustrating a flow of processing (part 2)
Figure 9:
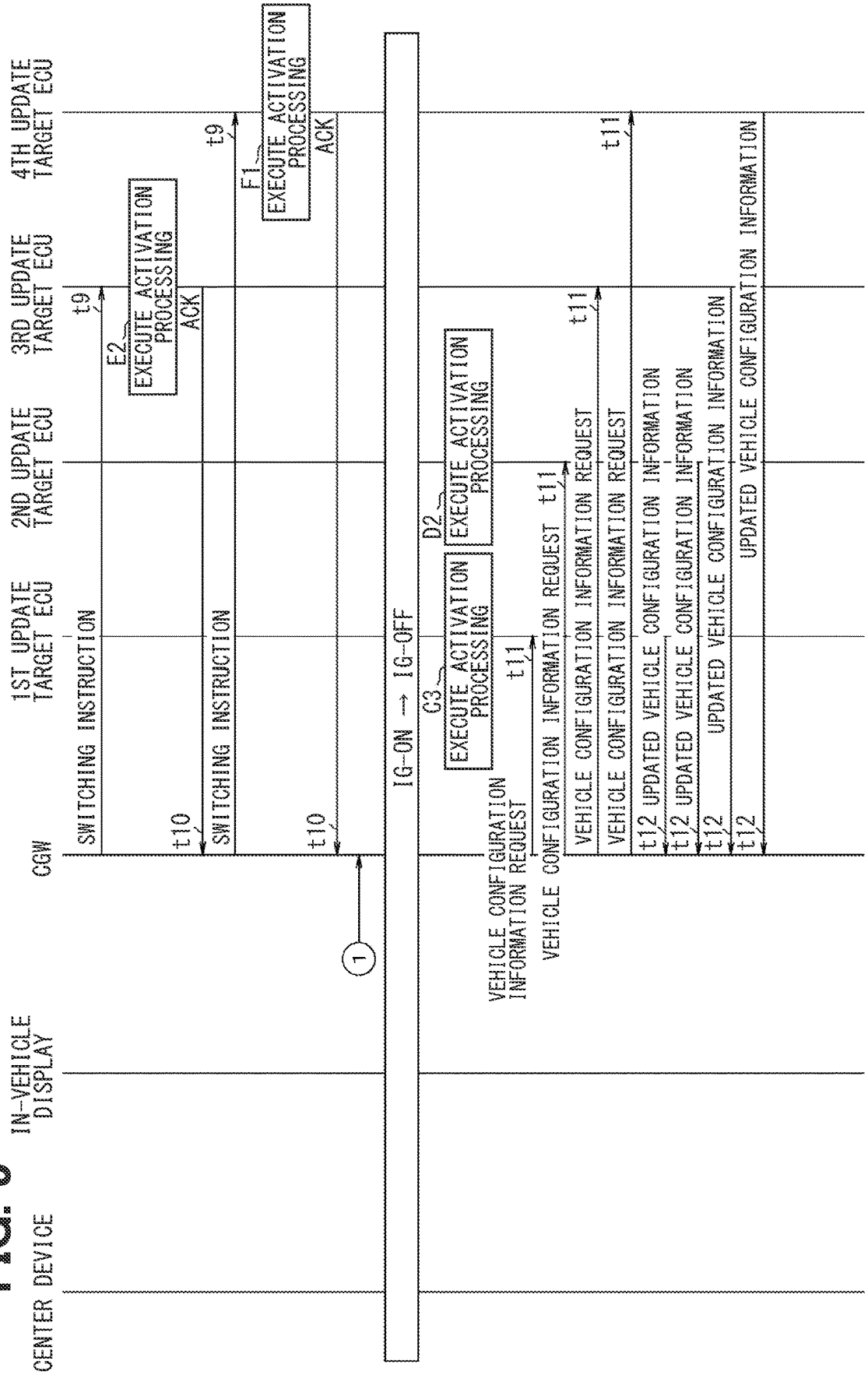
FIG. 9 is a diagram illustrating a flow of processing (part 3)
Figure 10:
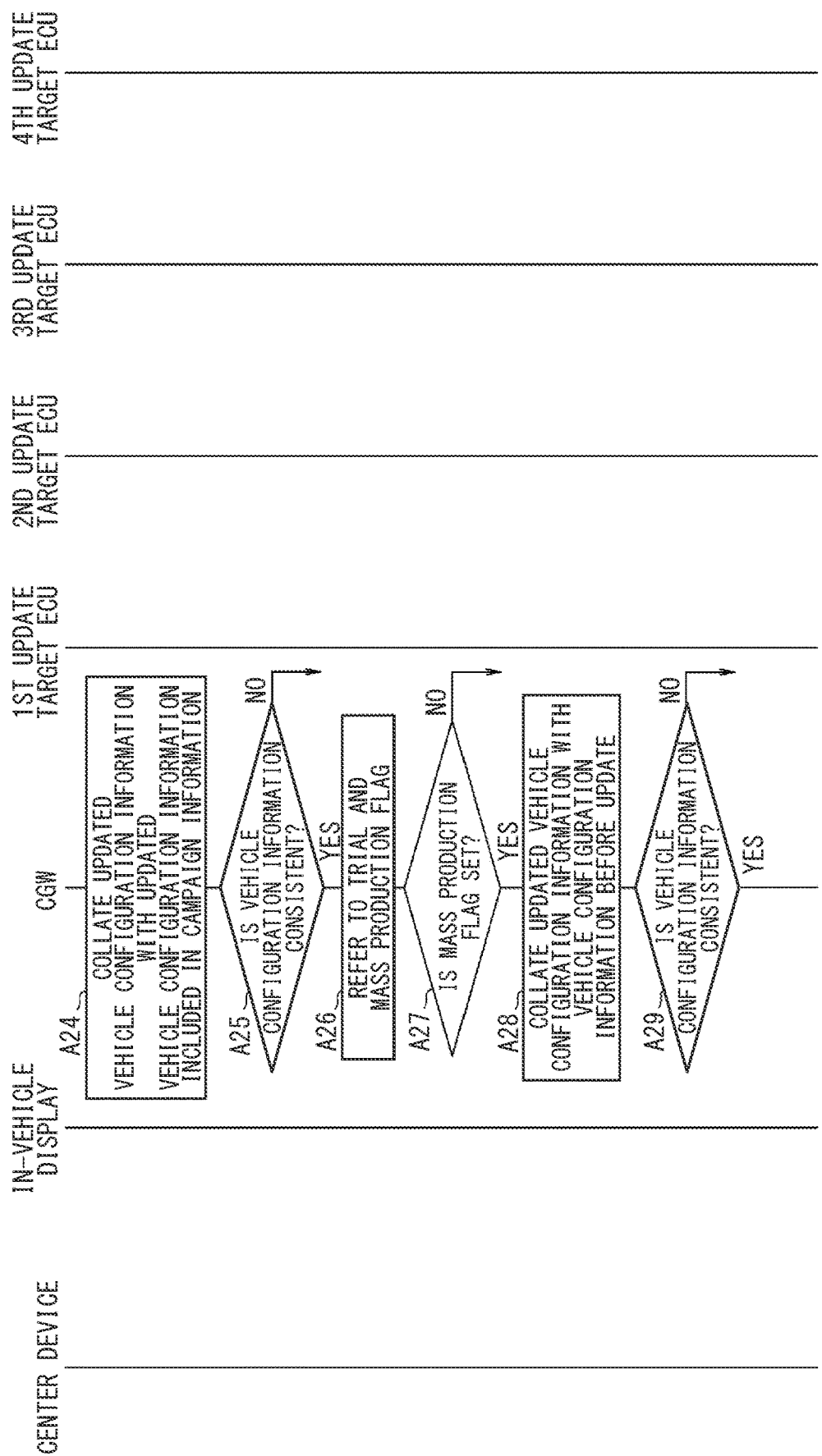
FIG. 10 is a diagram illustrating a flow of processing (part 4)
Figure 11:
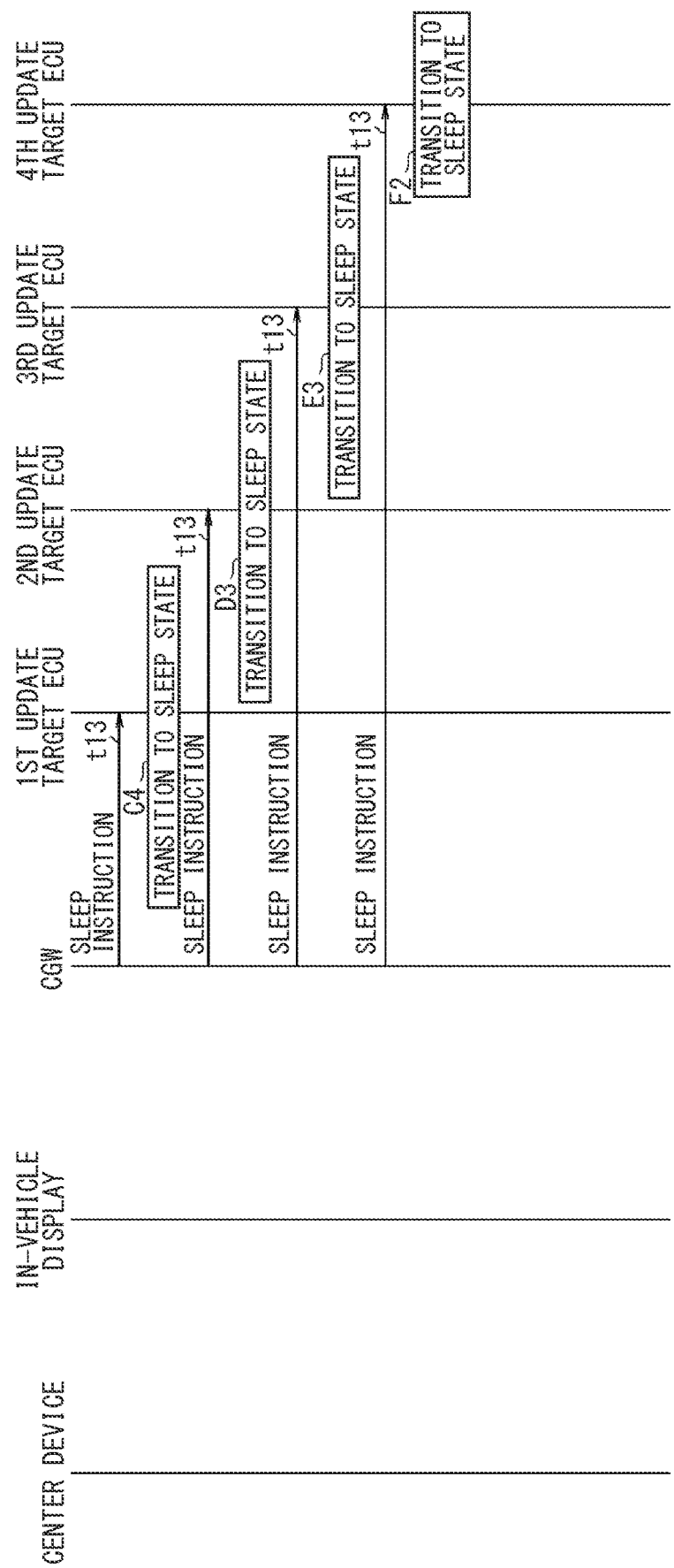
FIG. 11 is a diagram illustrating a flow of processing (part 5)
Figure 12:
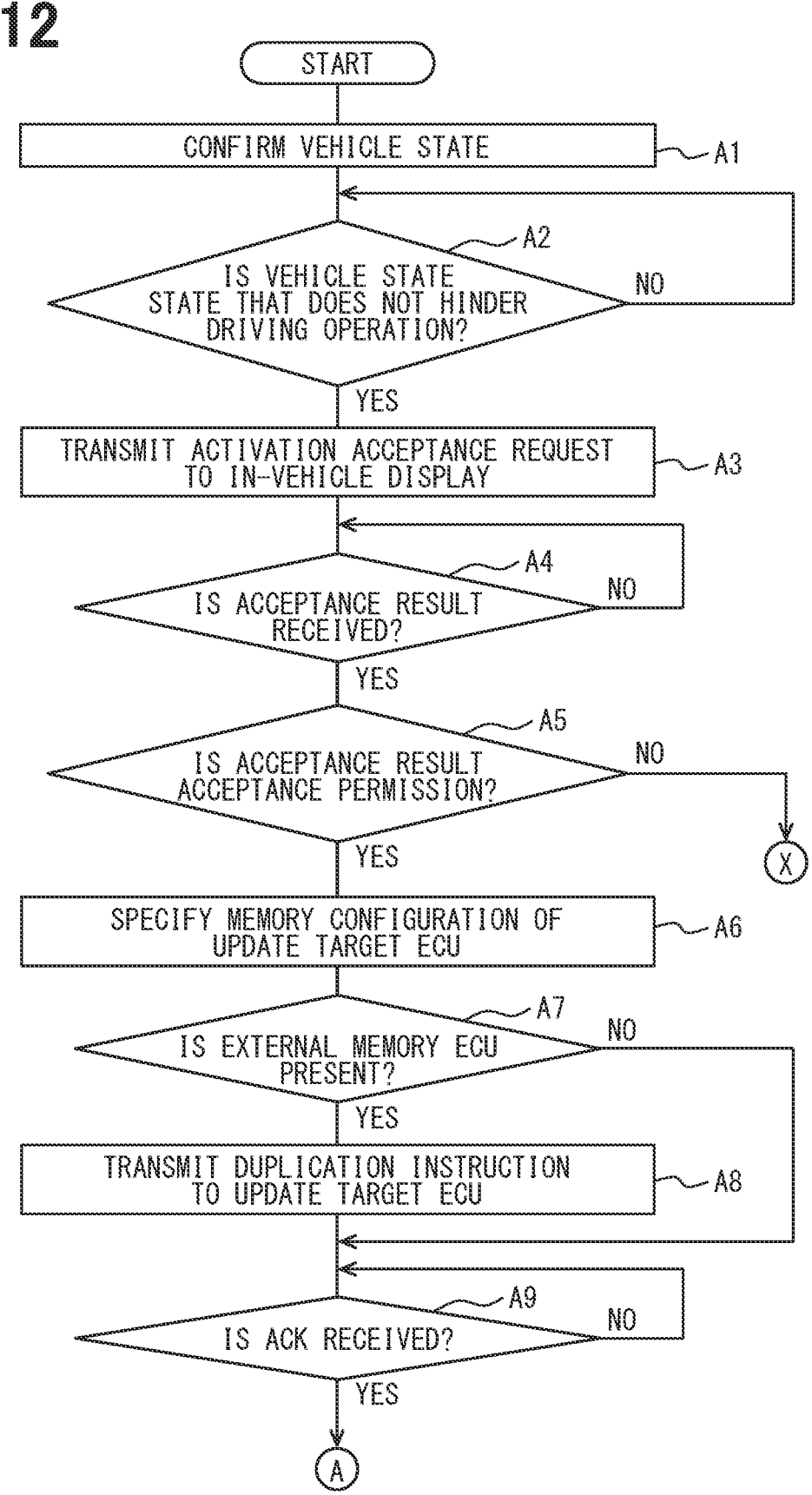
FIG. 12 is a flowchart (part 1)
Figure 13:
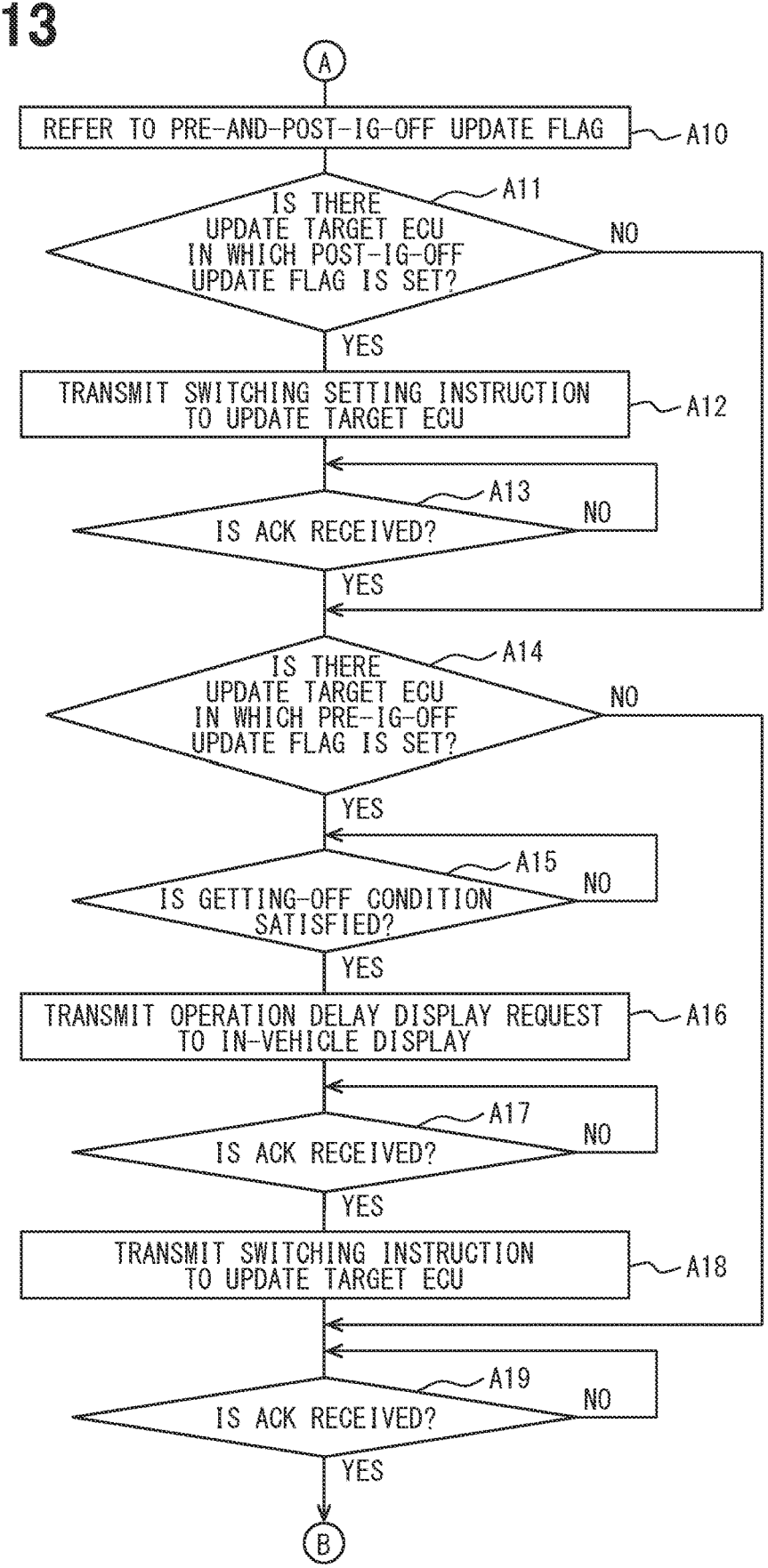
FIG. 13 is a flowchart (part 2)
Figure 14:
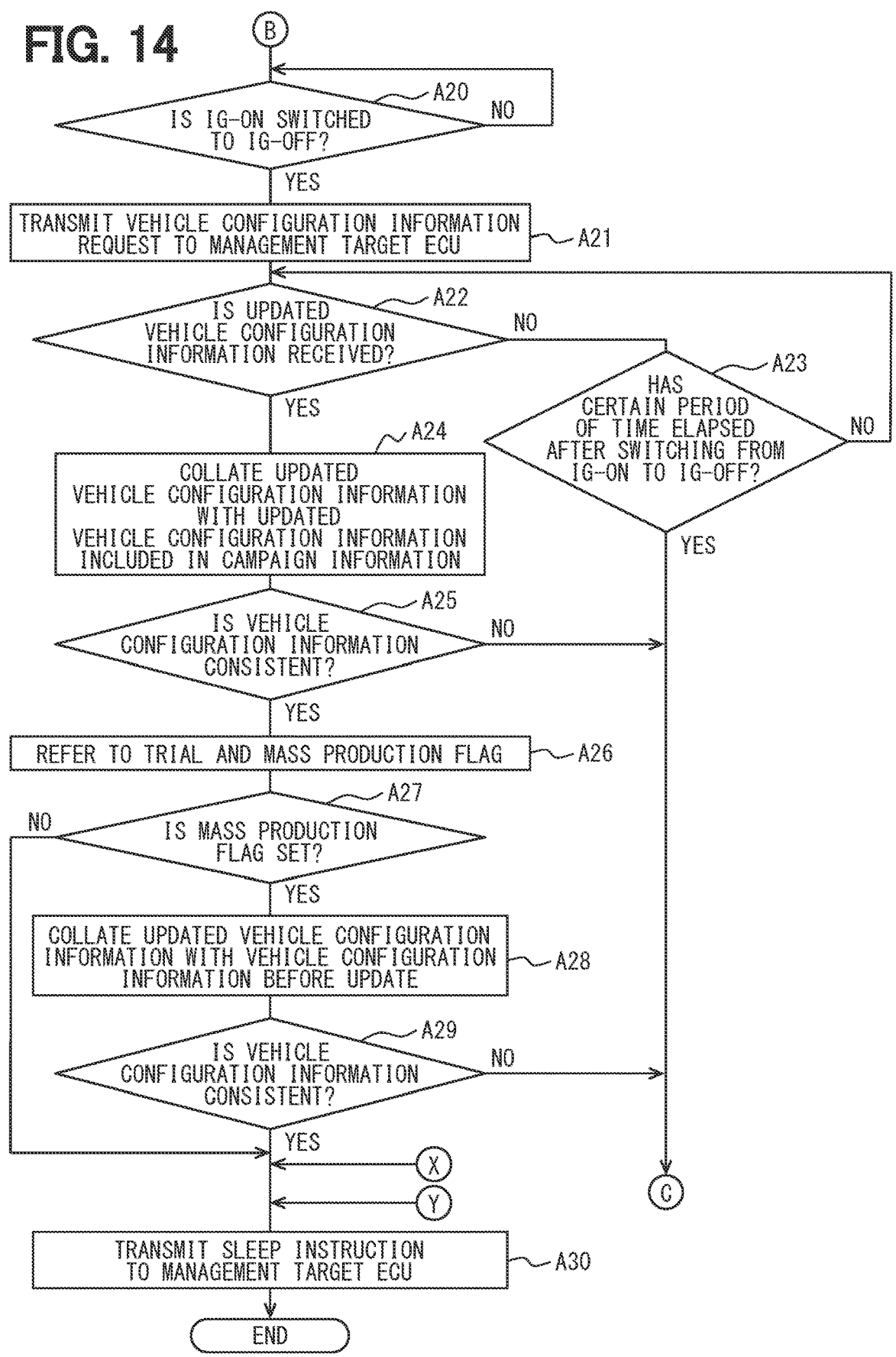
FIG. 14 is a flowchart (part 3)
Figure 15:
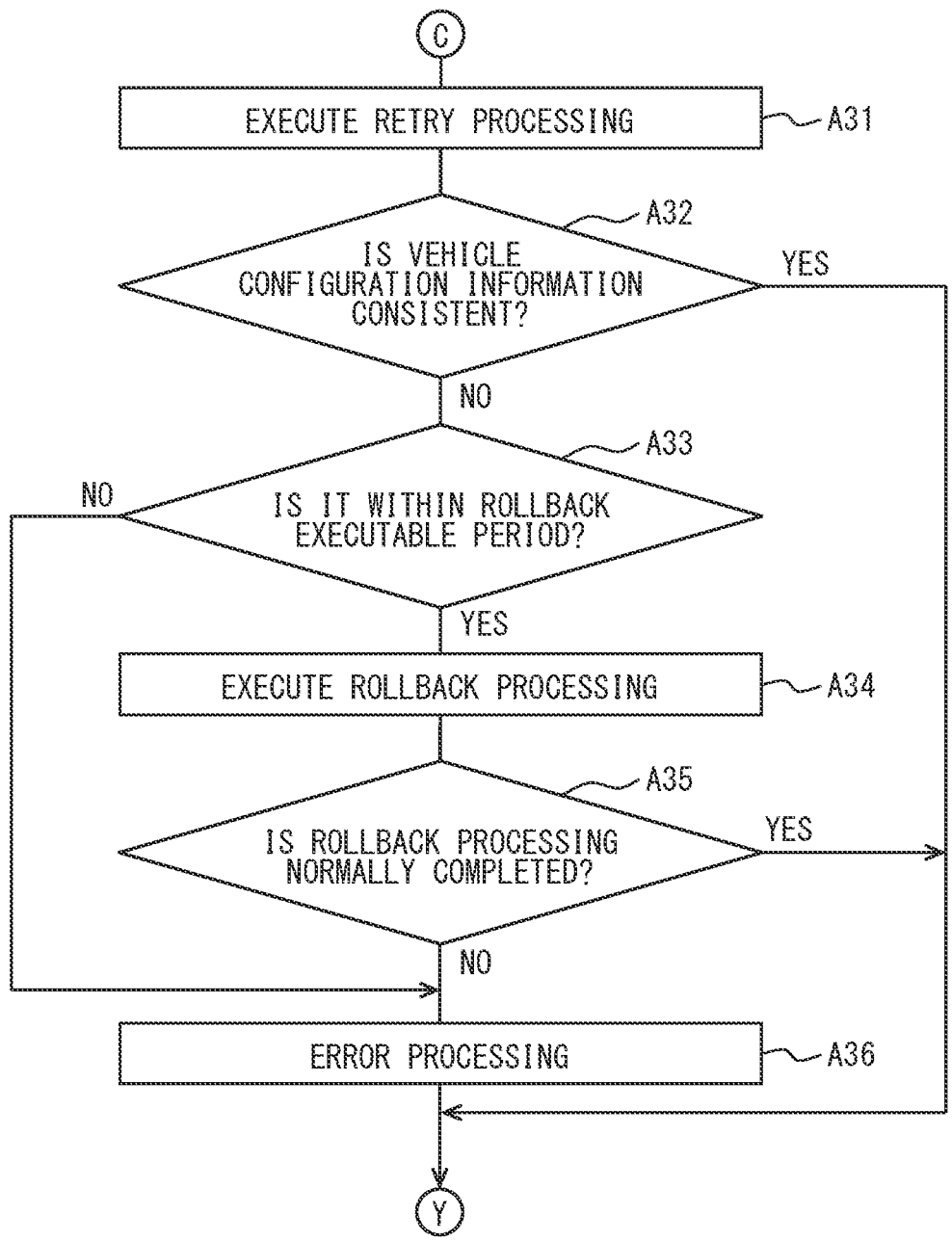
FIG. 15 is a flowchart (part 4)

As illustrated in FIG. 5, the activation processing instruction unit 40 includes a vehicle state determination unit 40a, an activation acceptance execution unit 40b, a memory configuration specification unit 40c, a duplication instruction transmission unit 40d, a switching setting instruction transmission unit 40e, a getting-off condition satisfaction determination unit 40f, a switching instruction transmission unit 40g, and an operation delay request unit 40h. As illustrated in FIG. 6, the system consistency check processing execution unit 41 includes a vehicle configuration information acquisition unit 41a and a consistency determination unit 41b. Each of the units 40 to 42, 40a to 40h, and 41a to 41b corresponds to a function executed by the update program. That is, the control unit 34 executes the update program and performs the functions of the units 40 to 42, 40a to 40h, and 41a to 41b.

When the download execution request is received from the control unit 34, the downloader 35 instructs the DCM 12 to execute the download processing. The campaign information storage unit 36 stores campaign information downloaded from the center device 3 to the CGW 13 via the DCM 12. The campaign information includes updated vehicle configuration information. The updated vehicle configuration information includes a target ID for specifying the management target ECU 19 including the update target ECU 19 and the non-update target ECU 19 that operates in cooperation with the update target ECU 19, the updated hardware version, and the updated software version.

The vehicle configuration information storage unit 37 stores the vehicle configuration information acquired from the management target ECU 19. The vehicle configuration information includes a target ID for specifying the management target ECU 19, the hardware version before update, the software version before update, the hardware version after update, and the software version after update.

The pre-and-post-IG-off update flag storage unit 38 stores a pre-IG-off update flag and a post-IG-off update flag. The pre-IG-off update flag and the post-IG-off update flag are selectively set and stored for each ECU 19. The pre-IG-off update flag is a flag that permits execution of the activation processing in the IG-on. For example, the pre-IG-off update flag is set in the ECU 19 that updates software that does not affect vehicle traveling control of the multimedia system. The post-IG-off update flag is a flag that prohibits execution of the activation processing in the IG-on. For example, the post-IG-off update flag is set in the ECU 19 that updates software that affects vehicle traveling control of the ADAS system or the drive system.

The trial and mass production flag storage unit 39 stores a trial production flag and a mass production flag. The trial production flag and the mass production flag are set selectively. The trial production flag is a flag set at the time of trial production before the vehicle equipped with the vehicle electronic control system 1 is shipped, and corresponds to a first flag. The mass production flag is a flag set at the time of mass production after the vehicle equipped with the vehicle electronic control system 1 is shipped, and corresponds to a second flag. In a state in which the trial production flag is set, it is possible to change the setting from the trial production flag to the mass production flag in a case where authentication is established. It is not possible to change the setting from the mass production flag to the trial production flag.

The vehicle state determination unit 40a determines the vehicle state based on, for example, vehicle speed information, driver status monitor information, and the like. In a state in which the installation processing is completed in the update target ECU 19, in a case where the vehicle state determination unit 40a determines that the vehicle state is a state in which the driving operation is not hindered, the activation acceptance execution unit 40b performs activation acceptance that inquires of the user whether to accept the activation processing. Specifically, for example, while the vehicle is stopped at "0 km/h" with the brake activated, the activation acceptance execution unit 40b inquires of the user whether to accept the activation processing by transmitting an activation acceptance request to the in-vehicle display 7, and causing the in-vehicle display 7 to display an activation acceptance screen that allows selection of the acceptance or non-acceptance of the activation processing.

The memory configuration specification unit 40c specifies the memory configuration of the update target ECU 19 based on the specification data, and specifies whether the flash memory 30d installed in the update target ECU 19 is a single-sided memory, a pseudo double-sided memory, a double-sided memory, or an external memory.

When the update target ECU 19 is an external memory ECU 19, the duplication instruction transmission unit 40d transmits, to the update target ECU 19, a duplication instruction instructing execution of duplication processing of the software stored in the memory area to the external memory.

The switching setting instruction transmission unit 40e transmits, to the update target ECU 19, a switching setting instruction to instruct execution of the activation processing at a timing when the next IG-on is switched to the IG-off.

The getting-off condition satisfaction determination unit 40f determines satisfaction of a getting-off condition for the user to get off. For example, when it is specified that the vehicle speed is "0 km/h", that the vehicle position is in the parking lot or at home, that the parking brake is operated, that the fastened seat belt is released, and the like, the getting-off condition satisfaction determination unit 40f predicts that the user will get off after the switching operation from the IG-on to the IG-off is performed, and determines that the getting-off condition is satisfied.

The switching instruction transmission unit 40g transmits the switching instruction to the update target ECU 19. The switching instruction transmission unit 40g refers to the pre-and-post-IG-off update flag storage unit 38 described above and determines which one of the pre-IG-off update flag and the post-IG-off update flag is set in the update target ECU 19. In a case where the pre-IG-off update flag is set in the update target ECU 19 and the software that does not affect the vehicle traveling control is updated, when the getting-off condition satisfaction determination unit 40f determines that the getting-off condition is satisfied, the switching instruction transmission unit 40g transmits the switching instruction to the update target ECU 19.

In a case where the pre-IG-off update flag is set in the update target ECU 19 and the software that does not affect the vehicle traveling control is updated, when the getting-off condition satisfaction determination unit 40f determines that the getting-off condition is satisfied, the operation delay request unit 40h requests the user to delay the switching operation from the IG-on to the IG-off by transmitting an operation delay display request to the in-vehicle display 7, and causing the in-vehicle display 7 to display an operation delay request screen for requesting a delay of the switching operation from the IG-on to the IG-off.

The vehicle configuration information acquisition unit 41a acquires the vehicle configuration information before update and the updated vehicle configuration information from the management target ECU 19, and stores the acquired vehicle configuration information before update and the acquired updated vehicle configuration information in the vehicle configuration information storage unit 37 described above.

The consistency determination unit 41b refers to the vehicle configuration information storage unit 37 and the campaign information storage unit 36, collates the updated vehicle configuration information acquired from the management target ECU 19 with the updated vehicle configuration information included in the campaign information downloaded from the center device 3, and determines the consistency of the vehicle configuration information. When it is determined that both pieces of the updated vehicle configuration information match, the consistency determination unit 41b determines that the vehicle configuration information is consistent, and when it is determined that both pieces of the updated vehicle configuration information do not match, the consistency determination unit 41b determines that the vehicle configuration information is not consistent.

The consistency determination unit 41b collates the updated vehicle configuration information acquired from the management target ECU 19 with the vehicle configuration information before update and determines the consistency of the vehicle configuration information. When it is determined that the version of the updated vehicle configuration information acquired from the management target ECU 19 is increased from the version of the vehicle configuration information before update, the consistency determination unit 41b determines that the vehicle configuration information is consistent. When it is determined that the version of the updated vehicle configuration information is not increased, the consistency determination unit 41b determines that the vehicle configuration information is not consistent. The increase in the version of the vehicle configuration information means an increase in version upgrade or version number.

When the consistency determination unit 41b determines that the vehicle configuration information is not consistent, the switching instruction transmission unit 40g performs retry processing of retransmitting the switching instruction to the update target ECU 19.

When the consistency determination unit 41b determines that the vehicle configuration information is not consistent, the rollback processing execution unit 42 performs rollback processing of returning the software of the update target ECU 19 to a state before the installation processing. In this case, the rollback processing execution unit 42 may perform the rollback processing without the switching instruction transmission unit 40g performing the retry processing, or may perform the rollback processing when the consistency determination unit 41b determines that the vehicle configuration information is still not consistent although the switching instruction transmission unit 40g has performed the retry processing. The rollback processing execution unit 42 refers to the trial and mass production flag storage unit 39, and performs the rollback processing in a case where the mass production flag is set. The rollback processing execution unit 42 performs the rollback processing in a case where it is within a predetermined period after completion of the activation processing in the update target ECU 19 and within a rollback executable period.

Next, the operation of the above-described configuration will be described with reference to FIGS. 7 to 17. In FIGS. 7 to 11, a first update target ECU 19 has a memory configuration of an external memory, and is the ECU 19 in which the post-IG-off update flag is set. A second update target ECU 19 has a memory configuration other than the external memory, and is the ECU 19 in which the post-IG-off update flag is set. A third update target ECU 19 has a memory configuration of the external memory, and is the ECU in which the pre-IG-off update flag is set. A fourth update target ECU 19 has a memory configuration other than the external memory, and is the ECU in which the pre-IG-off update flag is set.

In the CGW 13, for example, when a request of transmitting an activation acceptance request to the in-vehicle display 7 occurs due to the completion of the installation processing in the update target ECU 19, the control unit 34 confirms a vehicle state (A1), and determines whether the vehicle state is a state that does not hinder the driving operation (A2).

When it is determined that the vehicle speed is "0 km/h" and the brake is activated, and the vehicle state is a state that does not hinder the driving operation (A2: YES), for example, the control unit 34 transmits the activation acceptance request to the in-vehicle display 7 (A3, t1, corresponding to an activation acceptance execution procedure) and waits for reception of an acceptance result from the in-vehicle display 7 (A4). The state in which the brake is in operation includes, for example, a state in which a shift position is in a P range. When the activation acceptance request is received from the CGW 13, the in-vehicle display 7 displays an activation acceptance screen on which acceptance or non-acceptance of the activation processing can be selected (B1), and inquires of the user whether to accept the activation processing. When the user permits the activation acceptance, the in-vehicle display 7 transmits the acceptance permission to the CGW 13 as an acceptance result (t2). In the present embodiment, even with any memory configuration of the update target ECU 19, the activation acceptance request and the acceptance confirmation are performed in the IG-on. That is, in a case where the update target ECU 19 is an external memory ECU or a single-sided memory ECU, the activation acceptance request and the acceptance confirmation are performed in the IG-on state.

When it is determined that the acceptance result is received from the in-vehicle display 7 (A4: YES), the control unit 34 determines whether the acceptance result is the acceptance permission (A5). When it is determined that the acceptance result is the acceptance permission (A5: YES), the control unit 34 specifies the memory configuration of the update target ECU 19 based on the specification data (A6). The control unit 34 determines whether the external memory ECU 19 is included in the update target ECU 19 (A7).

When it is determined that the external memory ECU 19 is included in the update target ECU 19 (A7: YES), the control unit 34 transmits, to the update target ECU 19 which is the external memory ECU 19, a duplication instruction instructing execution of duplication processing of the software stored in the memory area to the external memory (A8, t3), and waits for reception of ACK from the update target ECU 19 which is the external memory ECU 19 (A9). When the duplication instruction is received from the CGW 13, the update target ECU 19 which is the external memory ECU 19 performs duplication processing of the software stored in the memory area to the external memory (C1, E1), and returns the ACK to the CGW 13 (t4).

When it is determined that the ACK is received from the update target ECU 19 which is the external memory ECU 19 (A9: YES), the control unit 34 refers to the pre-and-post-IG-off update flag storage unit 38 (A10), and determines whether there is an update target ECU 19 in which the post-IG-off update flag is set (A11). When it is determined that there is the update target ECU 19 in which the post-IG-off update flag is set (A11: YES), the control unit 34 transmits a switching setting instruction instructing the execution of the activation processing at a timing when the next IG-on state is switched to the IG-off state to the update target ECU 19 in which the post-IG-off update flag is set (A12, t5), and waits for reception of the ACK from the update target ECU 19 in which the post-IG-off update flag is set (A13). When the switching setting instruction is received from the CGW 13, the update target ECU 19 in which the post-IG-off update flag is set performs the switching setting so as to execute the activation processing at the timing when the next IG-on is switched to the IG-off (C2, D1), and returns the ACK to the CGW 13 (t6).

When it is determined that the ACK is received from the update target ECU 19 in which the post-IG-off update flag is set (A13: YES), the control unit 34 determines whether there is an update target ECU 19 in which the pre-IG-off update flag is set (A14). When it is determined that there is the update target ECU 19 in which the pre-IG-off update flag is set (A14: YES), the control unit 34 determines that the getting-off condition for the user to get off is satisfied (A15).

When it is determined that the getting-off condition is satisfied (A15: YES), the control unit 34 transmits an operation delay display request to the in-vehicle display 7 (A16, t7) and waits for reception of the ACK from the in-vehicle display 7 (A17). When the operation delay display request is received from the CGW 13, the in-vehicle display 7 displays an operation delay request screen (B2), and returns the ACK to the CGW 13 (t8).

When it is determined that the ACK is received from the in-vehicle display 7 (A17: YES), the control unit 34 transmits a switching instruction to the update target ECU 19 in which the pre-IG-off update flag is set (A18, t9), and waits for reception of the ACK from the update target ECU 19 in which the pre-IG-off update flag is set (A19). When the switching instruction is received from the CGW 13, the update target ECU 19 in which the pre-IG-off update flag is set executes the activation processing (E2, F1), and transmits the ACK to the CGW 13 (t10). When it is determined that the ACK is received from the update target ECU 19 in which the pre-IG-off update flag is set (A19: YES), the control unit 34 waits for the switching from the IG-on to the IG-off (A20).

Here, when the switching operation from the IG-on to the IG-off is performed and the IG-on is switched to the IG-off, the update target ECU 19 in which the post-IG-off update flag is set receives the switching setting instruction from the CGW 13 in advance as described above, and thus the activation processing is executed when the IG-on is switched to the IG-off (C3, D2).

When it is determined that the IG-on is switched to the IG-off (A20: YES), the control unit 34 transmits a vehicle configuration information request to the management target ECU 19 (A21), determines whether the updated vehicle configuration information is received from the management target ECU 19 (A22), and determines whether a certain period of time has elapsed after the switching from the IG-on to the IG-off (A23).

When it is determined that the updated vehicle configuration information is received from the management target ECU 19 before a certain period of time elapses from the switching from the IG-on to the IG-off (A22: YES), the control unit 34 collates the updated vehicle configuration information received from the management target ECU 19 with the updated vehicle configuration information included in the campaign information (A24), and determines the consistency of the vehicle configuration information (A25). When it is determined that both pieces of the updated vehicle configuration information match each other and the vehicle configuration information is consistent (A25: YES), the control unit 34 refers to the trial and mass production flag storage unit 39 (A26) and determines whether the mass production flag is set (A27).

When it is determined that the mass production flag is set (A27: YES), the control unit 34 collates the updated vehicle configuration information received from the management target ECU 19 with the vehicle configuration information before update (A28), and determines the consistency of the vehicle configuration information (A29). When it is determined that the version of the updated vehicle configuration information received from the management target ECU 19 is increased from the version of the vehicle configuration information before update and the vehicle configuration information is consistent (A29: YES), the control unit 34 transmits a sleep instruction to the management target ECU 19 (A30, t13). When the sleep instruction is received from the CGW 13, the management target ECU 19 transitions from a wake-up state to a sleep state (C4, D3, E3, F2).

On the other hand, when it is determined that a certain period of time has elapsed after the switching from the IG-on to the IG-off before the updated vehicle configuration information is received from the management target ECU 19 (A23: YES), or when it is determined that the updated vehicle configuration information received from the management target ECU 19 does not match the updated vehicle configuration information included in the campaign information, or the version of the updated vehicle configuration information received from the management target ECU 19 does not increase from the version of the vehicle configuration information before update and the vehicle configuration information is not consistent (A25: NO, or A29: NO), the control unit 34 executes retry processing of retransmitting the switching instruction to the update target ECU 19 (A31).

When the retry processing is executed, the control unit 34 collates the updated vehicle configuration information received from the management target ECU 19 with the updated vehicle configuration information included in the campaign information as described above, further collates with the vehicle configuration information before update, and determines the consistency of the vehicle configuration information again (A32). When it is determined that the vehicle configuration information is consistent (A32: YES), the control unit 34 transmits the sleep instruction to the management target ECU 19 (A30, t13).

On the other hand, it is determined that the vehicle configuration information is not consistent (A32: NO), and it is determined that the number of times of execution of the retry processing exceeds a predetermined number of times, the control unit 34 determines whether it is within a predetermined period after the completion of the activation processing, and determines whether it is within a rollback executable period (A33). When it is determined that it is within a predetermined period after the completion of the activation processing and it is determined that it is within a rollback executable period (A33: YES), the control unit 34 executes the rollback processing (A34).

When the rollback processing is executed, the control unit 34 determines whether the rollback processing is normally completed (A35), and when it is determined that the rollback processing is normally completed (A35: YES), the control unit 34 transmits the sleep instruction to the management target ECU 19 (A30, t13). On the other hand, when it is determined that the rollback processing is not normally completed (A35: NO), the control unit 34 performs error processing (A36) and transmits the sleep instruction to the management target ECU 19 (A30, t13).

Figure 16:
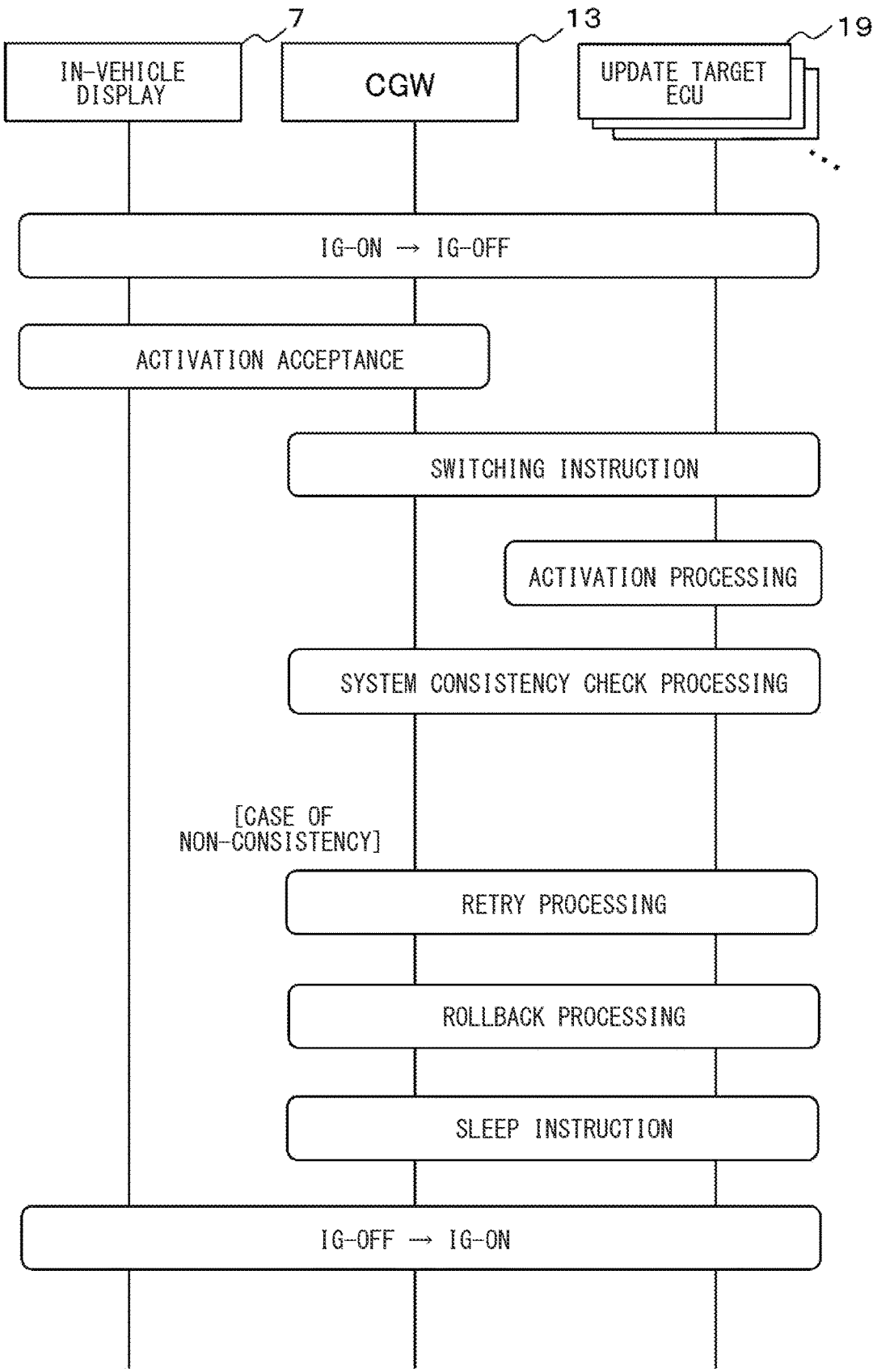
FIG. 16 is a diagram schematically illustrating a flow of processing (part 1)
Figure 17:
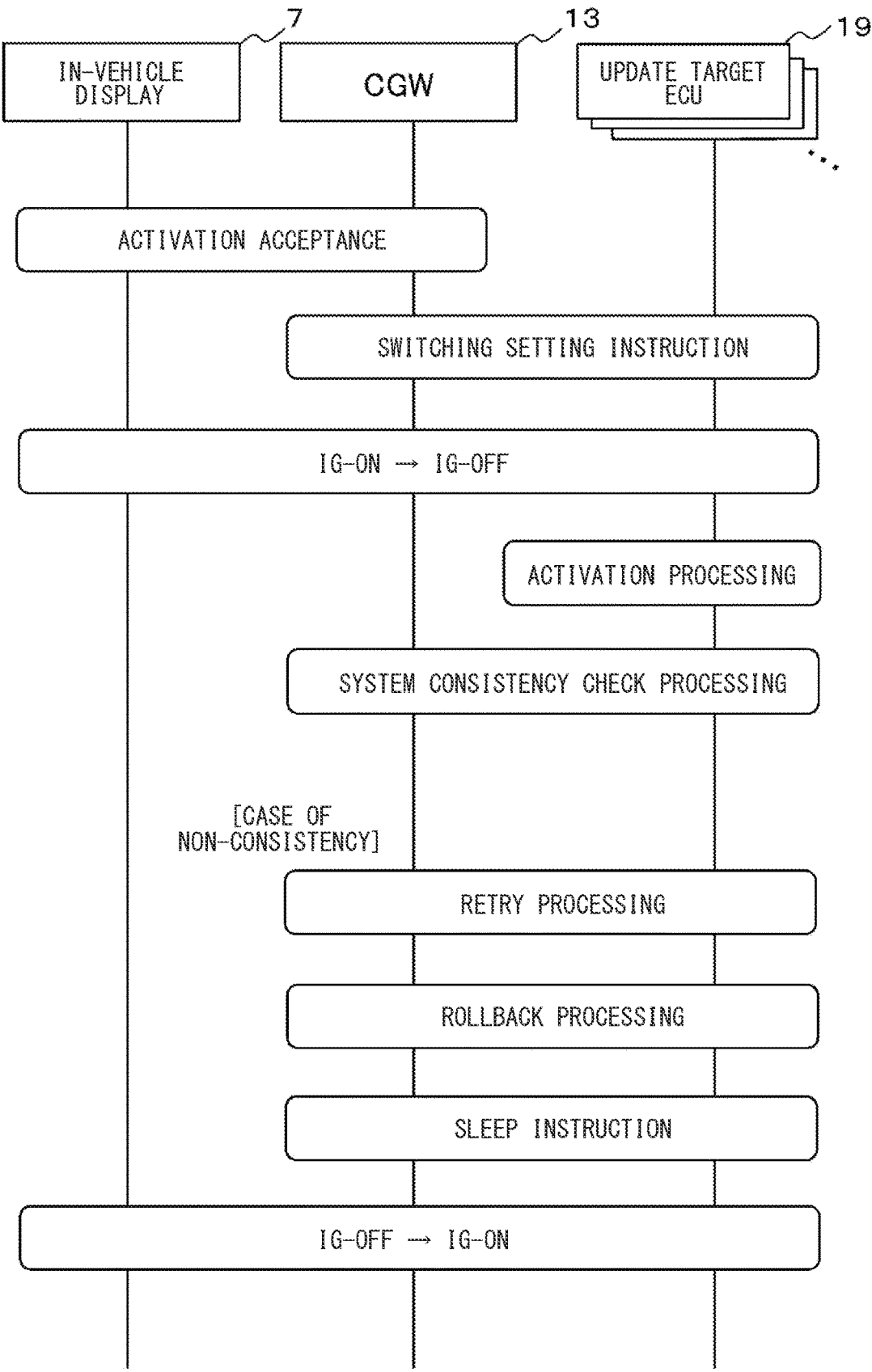
FIG. 17 is a diagram schematically illustrating a flow of processing (part 2).

As described above, in the present embodiment, unlike the related art in which the activation acceptance is performed after the IG-off as illustrated in FIG. 16, as illustrated in FIG. 17, by performing the activation acceptance before the IG-off, the activation acceptance can be performed in the IG-on state in which the vehicle battery 24 can be charged, and the power consumption of the vehicle battery 24 can be suppressed.

As described above, according to the present embodiment, the following operational effects can be obtained.

In the CGW 13, the activation acceptance is performed in the vehicle state of the IG-on state in which the vehicle battery 24 can be charged. Unlike the related art in which the activation acceptance is performed in the IG-off state, by performing the activation acceptance in the IG-on state, it is possible to ensure the safe and secure software update while suppressing the power consumption of the vehicle battery 24.

In the CGW 13, the switching setting instruction is transmitted to update target ECU 19 in the IG-on state. The activation processing can be promptly performed in the update target ECU 19 when the IG-off is switched to the IG-off.

In the CGW 13, in a case where it is determined that the vehicle is in a vehicle state that does not hinder the driving operation, for example, the vehicle is stopped, the activation acceptance is performed in the IG-on state. It is possible to cause the user to accept the activation in a safe and secure environment.

In the CGW 13, when the external memory ECU 19 is included in the update target ECU 19, the duplication instruction is transmitted to the update target ECU 19 which is the external memory ECU 19 in the IG-on state. By causing the external memory ECU 19 to perform the duplication processing of the software stored in the memory area to the external memory in the IG-on state, the power consumption of the vehicle battery 24 can be further suppressed.

In a case where the pre-IG-off update flag is set in the update target ECU 19 and the software that does not affect the vehicle traveling control is updated in the CGW 13, when the getting-off condition is satisfied, the user is requested to delay the switching operation from the IG-on to the IG-off by transmitting an operation delay display request to the in-vehicle display 7, and causing the in-vehicle display 7 to display an operation delay request screen for requesting a delay of the switching operation from the IG-on to the IG-off. By requesting the delay of the switching operation from the IG-on to the IG-off, it is possible to prompt the user to delay the switching operation from the IG-on to the IG-off. When the getting-off condition is satisfied, the switching instruction is transmitted to the update target node, and thus the activation processing can be appropriately performed in the update target ECU 19 in which the pre-IG-off update flag is set.

The CGW 13 acquires the updated vehicle configuration information from the management target ECU 19, collates the acquired updated vehicle configuration information with the updated vehicle configuration information included in the campaign information, and determines the consistency of the vehicle configuration information. It is possible to appropriately verify whether the update of the software is normally completed.

The CGW 13 acquires the updated vehicle configuration information from the management target ECU 19, collates the acquired updated vehicle configuration information with the vehicle configuration information before update, and determines the consistency of the vehicle configuration information. It is possible to more appropriately verify whether the update of the software is normally completed.

In the CGW 13, when it is determined that the vehicle configuration information is not consistent, the retry processing of retransmitting the switching instruction to the update target ECU 19 is performed. In a case where the update of the software is not normally completed, it is possible to appropriately handle the update by performing the retry processing.

In the CGW 13, when it is determined that the vehicle configuration information is not consistent, the rollback processing of returning the software of the update target ECU 19 to a state before the installation processing is performed. In a case where the update of the software is not normally completed, it is possible to appropriately handle the update by performing the retry processing.

In the CGW 13, the rollback processing is performed after the retry processing is performed. By performing the retry processing without immediately returning the software of the update target ECU 19 to the state before the installation processing, it is possible to increase the possibility of normally completing the update of the software.

In CGW 13, the rollback processing is performed in a case where it is within a predetermined period after the completion of the activation processing in the update target ECU 19. By limiting the period during which the rollback processing can be performed, it is possible to prevent the software from being written back to the old version due to unauthorized access or the like.

In the CGW 13, a predetermined period as a reference for determining whether to perform the rollback processing is dynamically determined. The limitation of the period during which the rollback processing can be performed can be arbitrarily changed. The limitation of the period during which the rollback processing can be arbitrarily changed, for example, in a case where the update of the software is intended for version upgrade by function improvement or the like, the predetermined period is set to be relatively long, and in a case where the update of the software is intended for defect correction, the predetermined period is set to be relatively long and short.

In the CGW 13, the rollback processing is performed in a case where the mass production flag is set. It is possible to update the software to an older version only during trial production by preventing the rollback processing from being performed in a case where the trial production flag is set.

In the CGW 13, it is possible to change the setting from the trial production flag to the mass production flag in a case where the authentication is established. It is possible to appropriately ensure the security in the case of changing the setting from the trial production flag to the mass production flag.

In the CGW 13, it is not possible to change the setting from the mass production flag to the trial production flag. By making it impossible to change the setting from the mass production flag to the trial production flag, it is possible to avoid complication of version management in advance.

Although the present disclosure has been described in accordance with examples, it is understood that the present disclosure is not limited to the examples and configurations. The present disclosure also includes various modifications and the modifications within an equivalent range. Various combinations and modes, and other combinations and modes including only one element, more elements, or less elements are also within the scope and idea of the present disclosure.

In a case where the update target ECU 19 is the external memory ECU 19, the example in which the duplication instruction is transmitted to the update target ECU 19 which is the external memory ECU 19 has been described. However, the duplication instruction is not necessarily transmitted, and the duplication instruction may not be transmitted. That is, it may not necessarily cause the external memory ECU 19 to perform the duplication processing of the software stored in the memory area to the external memory before the IG-off.

Although the configuration in which the pre-IG-off update flag and the post-IG-off update flag are stored in the pre-and-post-IG-off update flag storage unit 38 has been exemplified, information corresponding to the pre-IG-off update flag and the post-IG-off update flag may be stored in the specification data. In this case, the control unit 34 may refer to the specification data and determine whether to permit or prohibit the execution of the activation processing before the IG-off. The pre-IG-off update flag and the post-IG-off update flag may not be provided, and the switching setting instruction may be transmitted to all the update target ECUs 19.

Although the case of executing the retry processing has been described, the retry processing may not be executed and may be omitted. That is, when it is determined that a certain period of time has elapsed after the switching from the IG-on to the IG-off before the updated vehicle configuration information is received from the management target ECU 19 (A22: YES), or when it is determined that the vehicle configuration information is not consistent (A24: NO, A28: NO), the control unit 34 may execute the rollback processing in a case where it is within the rollback executable period without executing the retry processing of retransmitting the switching instruction to the update target ECU 19 (A33).

The control units and patterns thereof described in the present disclosure may be realized by a dedicated computer provided by configuring a processor and memory programmed to execute one or more functions embodied by the computer program. Alternatively, the control units and the patterns thereof described in the present disclosure may be realized by a dedicated computer provided by configuring the processor with one or more dedicated hardware logic circuits. Alternatively, the control units and the patterns described in the present disclosure may be realized by one or more dedicated computer including a combination of a processor and a memory programmed to execute one or more functions and a processor including one or more hardware logic circuits. The computer program may also be stored on a computer readable and non-transitory tangible storage medium as instructions executed by a computer.

What is claimed is:

1. A vehicular electronic control device that is installed in a vehicle capable of switching between a chargeable state in which a vehicle battery is capable of being charged and an unchargeable state in which the vehicle battery is incapable of being charged, and operates with power supplied from the vehicle battery as operating power, the vehicular electronic control device comprising:
   an activation acceptance execution unit that is configured to perform activation acceptance for inquiring of a user whether to accept activation processing of activating updated software after completion of installation processing of writing update data in an update target node to generate the updated software;
   a switching instruction transmission unit that is configured to transmit during the chargeable state a switching instruction that executes the activation processing during the chargeable state to the update target node executing the activation processing during the chargeable state in a case where acceptance permission of activation is specified; and
   a switching setting instruction transmission unit that is configured to transmit during the chargeable state a switching setting instruction that executes the activation processing during the unchargeable state to the update target node executing the activation processing during the unchargeable state in a case where the acceptance permission of activation is specified,
   wherein
   the activation acceptance execution unit performs the activation acceptance during the chargeable state.

2. The vehicular electronic control device according to claim 1 wherein
   the switching setting instruction transmission unit transmits, to the update target node, the switching setting instruction that executes the activation processing at a time of switching from the next chargeable state to the unchargeable state.

3. The vehicular electronic control device according to claim 1, further comprising
   a vehicle state determination unit that determines a vehicle state,
   wherein
   the activation acceptance execution unit performs the activation acceptance during the chargeable state in a case where it is determined that the vehicle state does not hinder a driving operation.

4. The vehicular electronic control device according to claim 1, further comprising:
   a memory configuration specification unit that specifies a memory configuration of the update target node; and
   a duplication instruction transmission unit that transmits, to the update target node, a duplication instruction that instructs execution of duplication processing of software stored in a memory area to an external memory in a case where the update target node is a node having a memory configuration including the external memory,
   wherein
   the duplication instruction transmission unit transmits the duplication instruction to the update target node during the chargeable state.

5. The vehicular electronic control device according to claim 1, further comprising:
   a getting-off condition satisfaction determination unit that determines satisfaction of a getting-off condition under which the user gets off; and
   an operation delay request unit that requests a delay of a switching operation of the vehicle battery from the chargeable state to the unchargeable state,
   wherein
   in a case where the update target node is a node that updates software that does not affect vehicle traveling control, the operation delay request unit requests a delay of the switching operation when it is determined that the getting-off condition is satisfied.

6. The vehicular electronic control device according to claim 5, wherein
   in a case where the update target node is a node that updates the software that does not affect the vehicle traveling control, the switching instruction transmission unit transmits the switching instruction to the update target node when it is determined that the getting-off condition is satisfied.

7. The vehicular electronic control device according to claim 1, further comprising:
   a vehicle configuration information acquisition unit that acquires updated vehicle configuration information from a management target node including the update target node; and
   a consistency determination unit that collates the updated vehicle configuration information with updated vehicle configuration information included in campaign information to determine consistency of the vehicle configuration information.

8. The vehicular electronic control device according to claim 7, wherein
   the vehicle configuration information acquisition unit acquires vehicle configuration information before update from the management target node, and
   the consistency determination unit collates the updated vehicle configuration information with the vehicle configuration information before update to determine the consistency of the vehicle configuration information.

9. The vehicular electronic control device according to claim 7, wherein
   the switching instruction transmission unit performs retry processing of retransmitting the switching instruction to the update target node in a case where the consistency determination unit determines that the vehicle configuration information is not consistent.

10. The vehicular electronic control device according to claim 7, further comprising
    a rollback processing execution unit that performs rollback processing of returning software of the update target node to a state before the installation processing,
    wherein
    the rollback processing execution unit performs the rollback processing in a case where the consistency determination unit determines that the vehicle configuration information is not consistent.

11. The vehicular electronic control device according to claim 10, wherein
after the switching instruction transmission unit performs the retry processing of retransmitting the switching instruction to the update target node when the consistency determination unit determines that the vehicle configuration information is not consistent, the rollback processing execution unit performs the rollback processing in a case where the consistency determination unit determines again that the vehicle configuration information is not consistent.

12. The vehicular electronic control device according to claim 10, wherein
the rollback processing execution unit performs the rollback processing in a case where it is within a predetermined period after completion of activation processing in the update target node.

13. The vehicular electronic control device according to claim 12, wherein
the rollback processing execution unit dynamically determines the predetermined period.

14. The vehicular electronic control device according to claim 10, wherein
a first flag and a second flag are capable of being set selectively, and
the rollback processing execution unit performs the rollback processing in a case where the second flag is set.

15. The vehicular electronic control device according to claim 14, wherein
setting change from the first flag to the second flag is capable of being made in a case where authentication is established.

16. The vehicular electronic control device according to claim 14, wherein
the setting change from the second flag to the first flag is not allowed.

17. A non-transitory computer readable storage medium storing an update program causing a control unit of a vehicular electronic control device that is installed in a vehicle capable of switching between a chargeable state in which a vehicle battery is capable of being charged and an unchargeable state in which the vehicle battery is incapable of being charged, and operates with power supplied from the vehicle battery as operating power to
perform activation acceptance for inquiring of a user whether to accept activation processing of activating updated software after completion of installation processing of writing update data in an update target node to generate the updated software and during the chargeable state,
transmit during the chargeable state a switching instruction that executes the activation processing during the chargeable state to the update target node executing the activation processing during the chargeable state in a case where acceptance permission of activation is specified, and
transmit during the chargeable state a switching setting instruction that executes the activation processing during the unchargeable state to the update target node executing the activation processing during the unchargeable state in a case where the acceptance permission of activation is specified.

* * * * *